(12) United States Patent
Takatsuka et al.

(10) Patent No.: US 6,902,028 B2
(45) Date of Patent: Jun. 7, 2005

(54) ELECTRIC POWER STEERING CONTROL SYSTEM

(75) Inventors: Yuji Takatsuka, Hyogo (JP);
Katsuhiko Ohmae, Tokyo (JP);
Norihiro Yamaguchi, Tokyo (JP);
Susumu Zeniya, Tokyo (JP); Takayuki Kifuku, Tokyo (JP); Shigeki Ohtagaki, Tokyo (JP)

(73) Assignee: Mitsubishi Denki Kabushiki Kaisha, Tokyo (JP)

( * ) Notice: Subject to any disclaimer, the term of this patent is extended or adjusted under 35 U.S.C. 154(b) by 0 days.

(21) Appl. No.: 10/864,397

(22) Filed: Jun. 10, 2004

(65) Prior Publication Data

US 2004/0222037 A1 Nov. 11, 2004

Related U.S. Application Data

(62) Division of application No. 10/634,955, filed on Aug. 6, 2003, which is a division of application No. 09/995,675, filed on Nov. 29, 2001, now abandoned.

(30) Foreign Application Priority Data

Jun. 5, 2001 (JP) ........................................ 2001-169669

(51) Int. Cl.[7] ................................................. B62D 5/04
(52) U.S. Cl. ........................................ 180/446; 701/42
(58) Field of Search ................................ 180/443, 444, 180/446; 701/41, 42

(56) References Cited

U.S. PATENT DOCUMENTS

| 4,771,843 A | 9/1988 | Shimizu |
| 4,789,040 A | 12/1988 | Morishita et al. |
| 4,793,431 A | 12/1988 | Eto et al. |
| 5,355,315 A | 10/1994 | Daido et al. |
| 5,889,378 A | 3/1999 | Hayashi |
| 6,326,753 B1 | 12/2001 | Someya et al. |
| 6,380,706 B1 | 4/2002 | Kifuku et al. |
| 6,448,738 B1 | 9/2002 | Burton et al. |
| 2001/0026134 A1 | 10/2001 | Fukumoto et al. |
| 2003/0169001 A1 * | 9/2003 | Murakami et al. .......... 318/139 |

FOREIGN PATENT DOCUMENTS

JP          11-59444        3/1999

* cited by examiner

*Primary Examiner*—Kevin Hurley
(74) *Attorney, Agent, or Firm*—Sughrue Mion, PLLC

(57) ABSTRACT

Conventionally, there was a problem that in cases when it is difficult to place a temperature sensor in the vicinity of a heat-generating portion, overheating could not be prevented. Disclosed is an electric power steering control system including a torque sensor for detecting steering force of a steering system; a motor current determination unit for determining the motor current based on the steering force detected by the torque sensor; a temperature sensor for detecting an ambient temperature; a coefficient setting unit for setting a coefficient in accordance with the detected temperature obtained by means of the temperature sensor; a motor current detection unit for detecting a motor current being passed to a motor; a maximum current limit value calculation unit for calculating a maximum current limit value based on the detected current and the coefficient; a current limiting unit for selecting the smaller value between the motor current determined by the motor current determination unit and the maximum current limit value calculated and outputting this as a target current; and a motor current control section for passing the target current to the motor in such a way that the motor current is equal to the detected current, whereby a motor current limit being set according to temperature is applied.

6 Claims, 30 Drawing Sheets

ELECTRIC POWER STEERING CONTROL SYSTEM

This is a divisional of application Ser. No. 10/634,955 filed Aug. 6, 2003, which is a Divisional Application of abandoned U.S. application Ser. No. 09/995,675 filed Nov. 29, 2001; the above noted prior applications are all hereby incorporated by reference.

This application is based on Application No. 2001-169669, filed in Japan on Jun. 5, 2001, the contents of which are hereby incorporated by reference.

BACKGROUND OF THE INVENTION

1. Field of the Invention

The present invention relates to electric power steering for reducing a required steering force in a steering system by means of mechanical power of a motor. More particularly, the present invention relates to an electric power steering control system for preventing overheating of the motor and a motor drive circuit.

2. Description of the Related Art

As an example of an art having an objective of preventing overheating of a motor and a motor drive circuit, there exists an electric power steering device described in Japanese Patent Application Laid-open No. 11-59444.

According to the above-mentioned conventional art, a heat sensor is provided on a periphery of the motor or the motor drive circuit portion, a motor current limit value is calculated based on a heating value estimated from a temperature detected by the temperature sensor and a current of the motor, and the motor current is limited by means of this calculated motor current limit value. Accordingly, the overheating of the motor is prevented.

According to the above-mentioned conventional art, the heat sensor is provided to a vicinity of a location generating heat, and control for preventing overheating is realized by means of directly detecting an ambient temperature of the location generating heat. However, in an actual system there are cases when it is difficult, for reasons of construction and cost, to place the temperature sensor in the vicinity of the heat-generating part. In such cases, prevention of overheating becomes problematic in the conventional art. Furthermore, in a case when there exists a plurality of heat-generating parts (or parts at which it is desirable to estimate the temperature thereof), a plurality of temperature sensors and I/F circuits need to be installed. Therefore, there was a problem that it was disadvantageous in terms of cost and miniaturization.

SUMMARY OF THE INVENTION

The present invention has been made to solve the problems described above. Therefore, an object of the present invention is to obtain an electric power steering control system capable of achieving overheating prevention even without a temperature sensor being provided to a vicinity of a heat-generating location.

An electric power steering control system according to the present invention comprises a motor for adding a steering assisting force to a steering system; a steering force detection section for detecting steering force in the steering system; a motor current determination section for determining a motor current based on at least the steering force detected by means of the steering force detection section; a temperature detection section for detecting an ambient temperature; a coefficient setting section for setting a coefficient in accordance with a detected temperature obtained by means of the temperature detection section; a motor current determination section for detecting a current being passed to the motor; a maximum current limit value calculation section for calculating a maximum current limit value based on the detected current detected by means of the motor current detection section and the coefficient set by the coefficient setting section; a current limiting section for selecting and outputting as a target current the smaller of either the motor current determined by means of the motor current determination section or the maximum current value calculated by means of the maximum current limit value calculation section; a motor current control section for passing the target current to the motor such that the target current becomes equal to the detected current being detected by the motor current detection section.

An electric power steering control system according to the present invention comprises a motor for adding steering assistance force to a steering system; a steering force detection section for detecting steering force of the steering system; a motor current determination section for determining a motor current based on at least the steering force detected by means of the steering force detection section; a temperature detection section for detecting an ambient temperature; a timer for measuring time from when predetermined conditions are established; a control temperature calculation section for calculating a control temperature based on the temperature detected by the temperature detection section and the time measured by the timer; a coefficient setting section for setting a coefficient based on the control temperature calculated by the control temperature calculation section; a motor current detection section for detecting a current being passed to the motor; a maximum current limit value calculation section for calculating a maximum current limit value based on a current detected by the motor current detection section and the coefficient set by the coefficient setting section; a current limiting section for selecting the smaller value between the motor current determined by the motor current determination section and the maximum current limit value calculated by the maximum current limit value calculation section, and outputting this as a target current; and a motor current control section for passing the target current to the motor in such a way that the motor current is equal to the current detected by the motor current detection section.

An electric power steering control system according to the present invention comprises a motor for adding steering assistance force to a steering system; a steering force detection section for detecting steering force of the steering system; a motor current determination section for determining a motor current based on at least the steering force detected by means of the steering force detection section; a temperature detection section for detecting an ambient temperature; a timer for measuring time from when predetermined conditions are established; a control temperature calculation section for calculating a control temperature based on the temperature detected by the temperature detection section and the time measured by the timer; a coefficient setting section for setting a coefficient based on the control temperature calculated by the control temperature calculation section and the temperature detected by the temperature detection section; a motor current detection section for detecting a current being passed to the motor; a maximum current limit value calculation section for calculating a maximum current limit value based on a current detected by the motor current detection section and the coefficient set by the coefficient setting section; a current limiting section for selecting the smaller value between the motor current determined by the motor current determination section and the maximum current limit value calculated by the maximum current limit value calculation section, and outputting this as a target current; and a motor current control section for passing the target current to the motor in such a way that the motor current is equal to the current detected by the motor current detection section.

Further, in an electric power steering control system according to the present invention, the predetermined condition is that the key switch is on.

Further, an electric power steering control system according to the present invention further comprises an engine rotation detection section for detecting the number of engine rotations, wherein the predetermined condition is that the number of engine rotations detected by the engine rotation detection section is greater than a predetermined value.

Further, an electric power steering control system according to the present invention further comprises a vehicle speed detection section for detecting a vehicle speed, wherein the predetermined condition is that the vehicle speed detected by the vehicle speed detection section is above a predetermined value.

Further, in an electric power steering control system according to the present invention, the predetermined condition is that the steering force detected by the steering force detection section is greater than a predetermined value.

Further, in an electric power steering control system according to the present invention, the predetermined condition is that the motor current is greater than a predetermined value.

Further, in an electric power steering control system according to the present invention, the coefficient setting unit sets the coefficient in accordance with a detected temperature at the time of activation obtained by means of the temperature detection section.

Further, an electric power steering control system according to the present invention further comprises a power supply holding section for holding a power supply until the temperature detected by the temperature detection section drops below a predetermined value after the key switch is turned off.

Further, an electric power steering control system according to the present invention further comprises a power supply holding section for holding a power supply until the temperature detected by the temperature detection section drops below a predetermined value after the key switch is turned off, or until a duration of time having elapsed since the key switch was turned off is measured and the elapsed duration of time becomes greater than a predetermined duration of time.

Additionally, in electric power steering control system according to the present invention, the control temperature calculation section calculates the control temperature based on a temperature that is the temperature detected by the temperature detection section and corrected by a correction amount set in accordance with characteristics of self-generation of heat, and the duration of time measured by the timer.

DETAILED DESCRIPTION OF THE PREFERRED EMBODIMENTS

Embodiment 1

Figure 1:
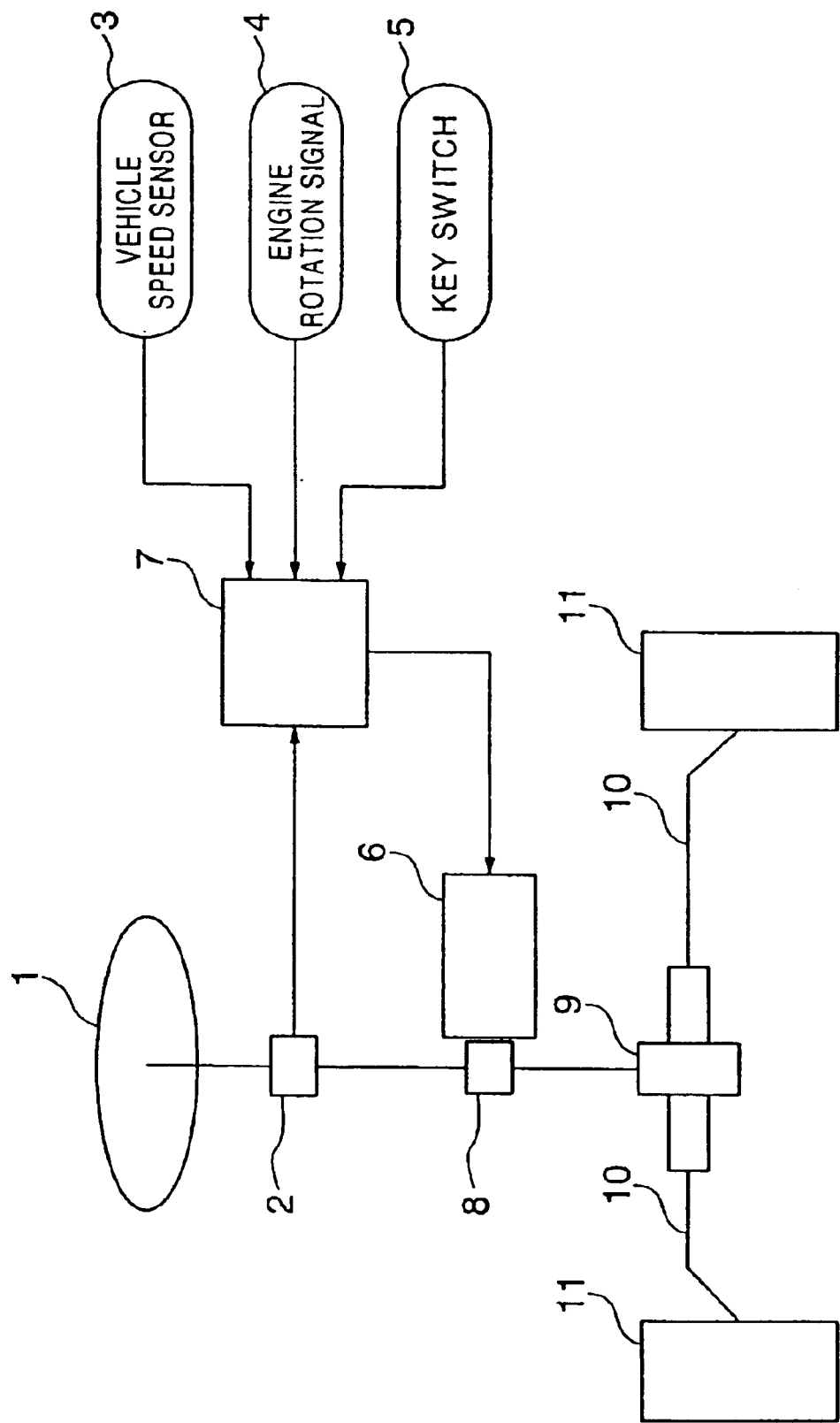
FIG. 1 is a diagram depicting a construction of an electric power steering control system according to Embodiment 1 of the present invention.

Explanation will now be made of an electric power steering control system according to Embodiment 1 of the present invention, making reference to the drawings. FIG. 1 is a diagram depicting a construction of the electric power steering control system according to Embodiment 1 of the present invention. Note that the same reference numerals in each of the drawings indicate the same or equivalent parts.

In FIG. 1, 1 is a handle; 2 is a torque sensor (i.e., steering force detection section) for detecting steering force of a steering system; 3 is a vehicle speed sensor (i.e., vehicle speed detection section) for detecting a vehicle speed; 4 is an engine rotation signal [i.e., engine rotation sensor (i.e., engine rotation detection section)] for obtaining the number of engine rotations; 5 is a key switch; 6 is a motor for adding a steering assisting force to the steering system; 7 is a control apparatus which is installed in a deep area of a panel in front of a driver seat and a passenger seat of the car and which controls the motor 6 based on information from the torque sensor 2, the vehicle speed sensor 3, the engine rotation signal 4, and the key switch 5; 8 is a deceleration apparatus for transmitting output of the motor 6 to the steering system and the like; 9 is a rack and pinion mechanism for converting a rotational force into a horizontal force; 10 is a tie rod for transmitting the horizontal force to a steering wheel to be described hereinafter.

Figure 2:
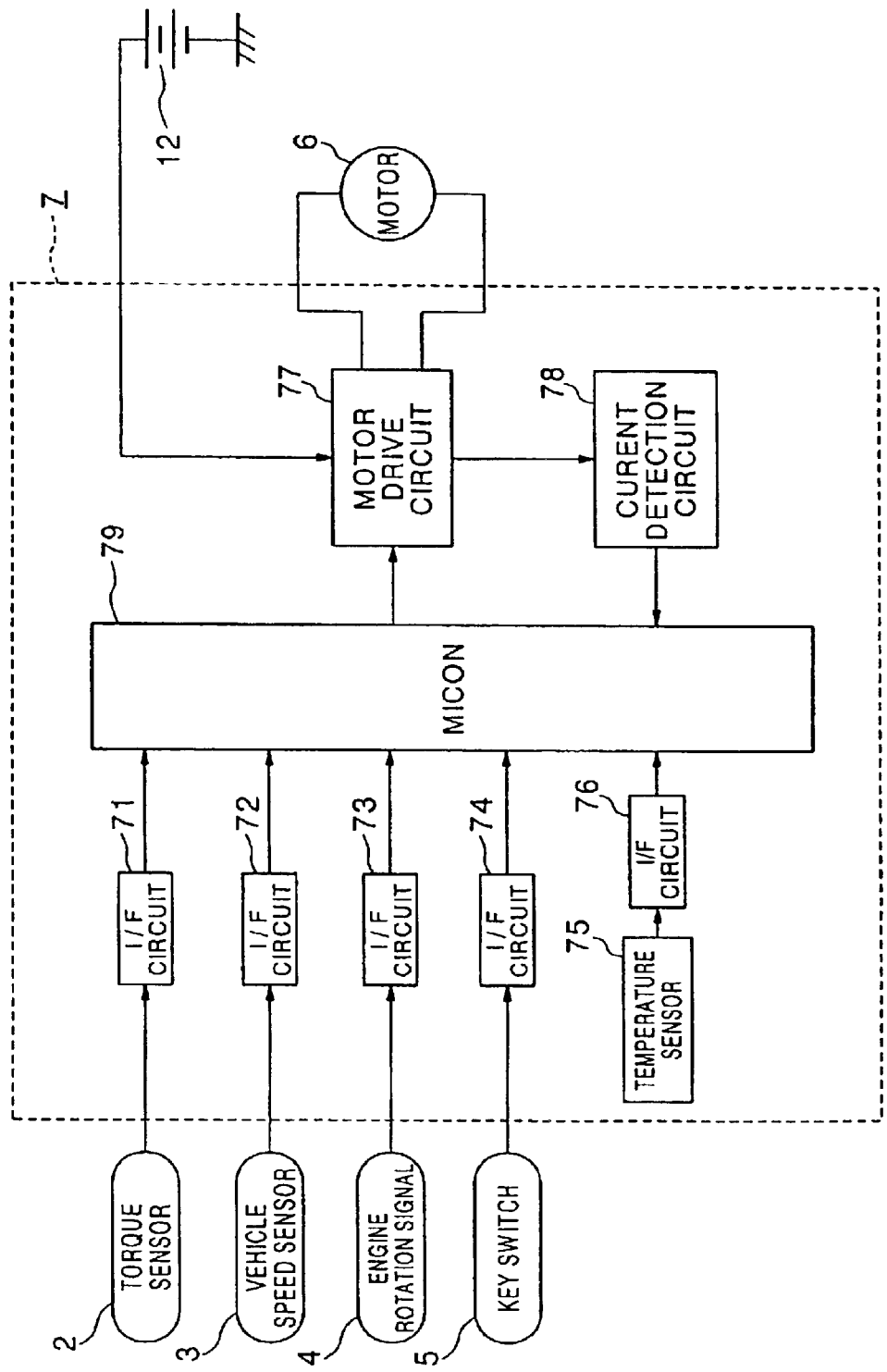
FIG. 2 is a block diagram depicting a construction of the a control apparatus of the electric power steering control system according to Embodiment 1 of the present invention.

FIG. 2 is a diagram depicting a construction of a control apparatus of the electric power steering control system according to Embodiment 1 of the present invention; and 11 is the tie rod.

In FIG. 2, the torque sensors 2 through the control device 7 are the same as those of FIG. 1. Reference numeral 12 is a battery for providing electric power to the control device 7. Further, 71 is an I/F circuit for inputting a signal from the torque sensor 2; 72 is an I/F circuit for inputting a signal from the vehicle speed sensor 3; 73 is an I/F circuit for inputting the engine rotation signal 4; 74 is an I/F circuit for inputting a signal from the key switch 5; 75 is the temperature sensor (the temperature detection section) for detecting the temperature; 76 is an I/F circuit for inputting a signal from the temperature sensor 75; 77 is a motor drive circuit for driving the motor 6; 78 is a current detection circuit for detecting the current being passed to the motor 6; and 79 is a micon for performing control of the electrical power steering.

Next, explanation will be made of an operation of the electric power steering control system according to Embodiment 1 of the present invention, making reference to the drawings.

Figure 3:
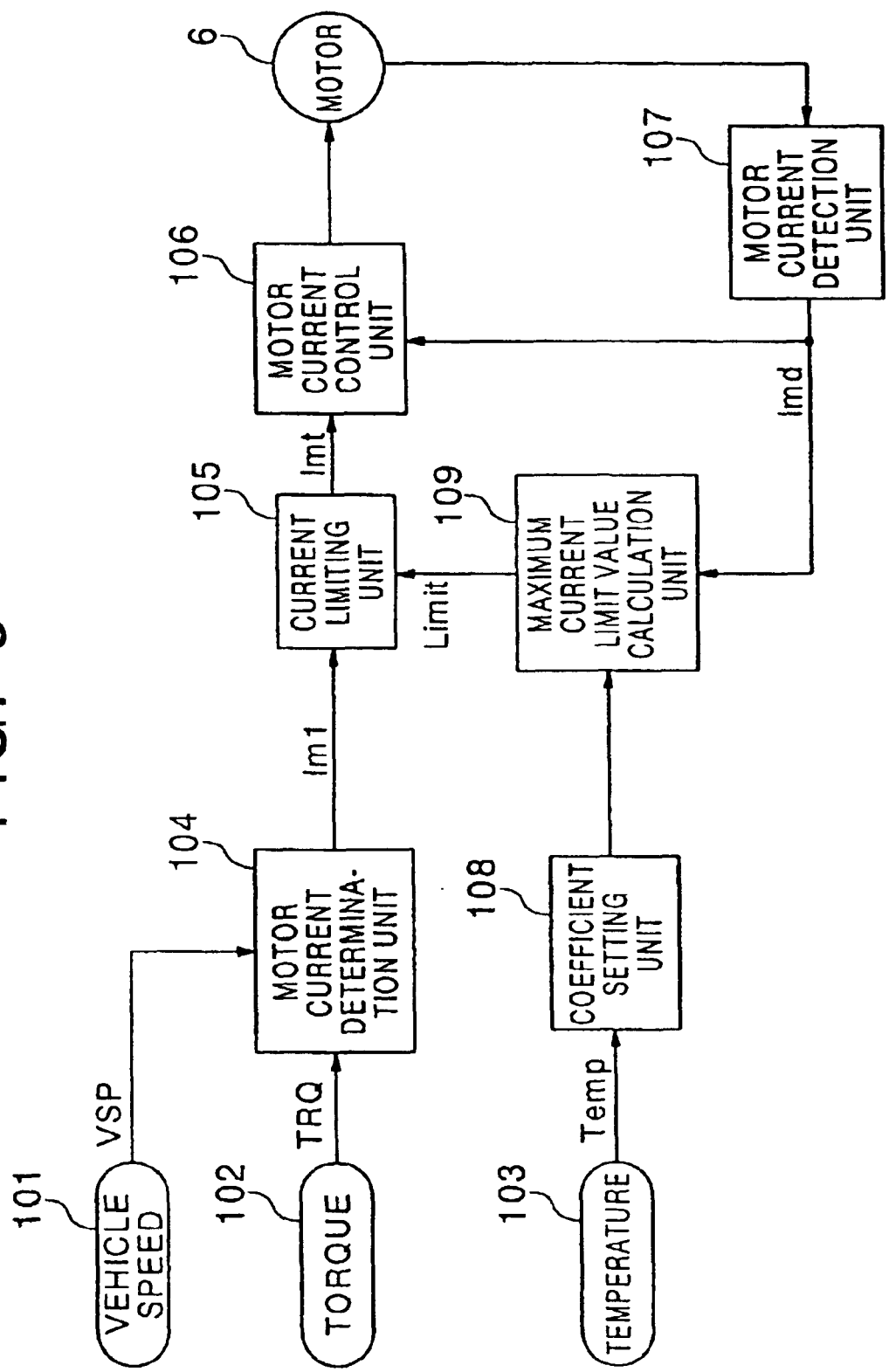
FIG. 3 is a diagram depicting a control block of the control apparatus of the electric power steering control system according to 1 of the present invention.

FIG. 3 is a diagram depicting a control block of processing carried out by the micon inside the control apparatus of the electric power steering control system according to Embodiment 1.

Explanation will now be made of the processing carried out by the micon 79. In FIG. 3, reference numeral 101 is a vehicle speed signal detected by the vehicle speed sensor 3; 102 is a torque signal detected by the torque sensor 2; and 103 is a temperature signal detected by the temperature sensor 75.

Further, in FIG. 3, 104 is a motor current determination unit (i.e., the motor current determination section) for determining, based on a vehicle speed signal 101 (VSP) and a torque signal 102 (TRQ), the motor current for assisting the steering force; 105 is a current limiting unit (i.e., the current limiting section) for applying a limit being the maximum current limit value (Limit), explained below, to the motor current (Iml) determined by the motor current determination unit 104; 106 is a motor current control unit (i.e., the motor current control section) for passing the target current (Imt) indicated by the current limiting unit 105 to the motor 6 in a controlled fashion such that the target current (Imt) is equivalent to the detected current (Imd) which is detected by an motor current detection unit explained below; and 107 is the motor current detection unit (i.e., the motor current detection section) for detecting the motor current and corresponds to the current detection circuit 78 of FIG. 2.

Additionally, in FIG. 3, 108 is a coefficient setting unit (i.e., the coefficient setting section) for setting a coefficient for calculation of the maximum current limit value described below in accordance with the temperature signal 103 (i.e., Temp); and 109 is a maximum current limit value calculation unit (i.e., the maximum current limit value calculation section) for calculating the maximum current limit value (i.e., Limit) based on the detected current (i.e., Imd) detected by means of the motor current detection unit 107 and the coefficient which is determined by means of the coefficient setting unit 108 (i.e., the maximum current limit value calculation section).

Figure 4:
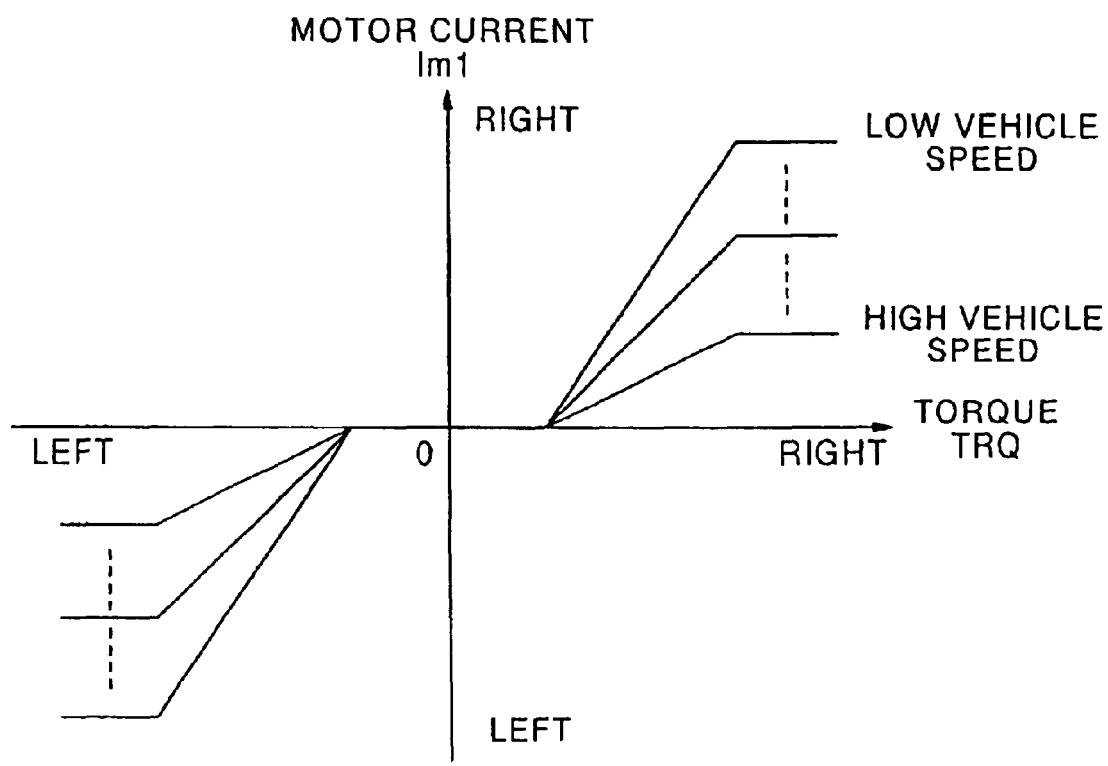
FIG. 4 is a diagram depicting input and output characteristics of a motor current determination unit of the control apparatus of the electric power steering control system, according to Embodiment 1 of the present invention.

FIG. 4 is a diagram depicting input output characteristics of the motor current determination unit.

Here explanation will be made of the motor current determination unit 104. The motor current determination unit 104 has the input and output characteristics shown in FIG. 4 and determines the motor current (Iml) in accordance with the torque (TRQ) and the vehicle speed (VSP). By having the characteristics shown in FIG. 4 a result is produced such that at a time of steering to the right the motor current is passed to the right direction, so less steering force is required. Further, at a time of steering to the left, on the other hand, the motor current is passed to the left direction, so less steering force is required. Additionally, altering the motor current in accordance with the vehicle speed (VSP) produces a result that the steering assisting force appropriate for each vehicle speed (ex, low vehicle speed through high vehicle speed) is generated.

Figure 5:
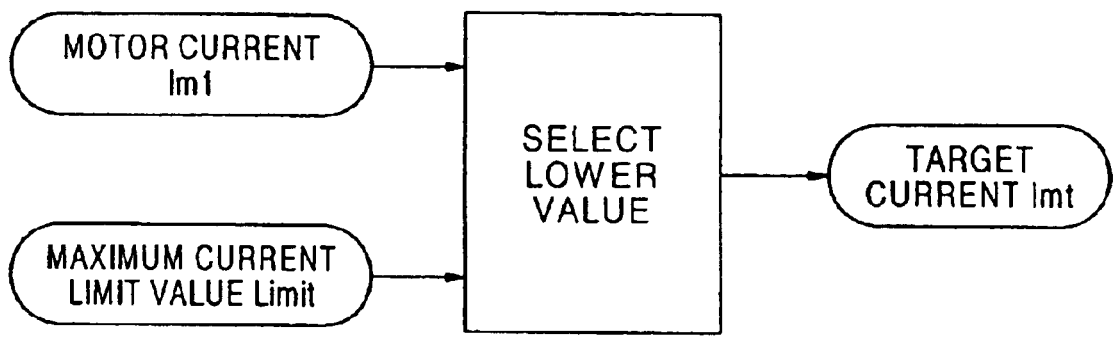
FIG. 5 is a diagram depicting a current limiting unit of the control apparatus of the electric power steering control system, according to Embodiment 1 of the present invention.

FIG. 5 is a diagram depicting a construction of the current limiting unit.

Next, explanation will be made of the current limiting unit 105. The current limiting unit 105 has a construction as shown in FIG. 5, and selects and outputs as a target current (i.e., Imt) the smaller of either the motor current (i.e., Iml) determined by means of the motor current determination unit 104 or the maximum current limit value (i.e., Limit) calculated by means of the maximum current limit value calculation unit 109.

Figure 6:
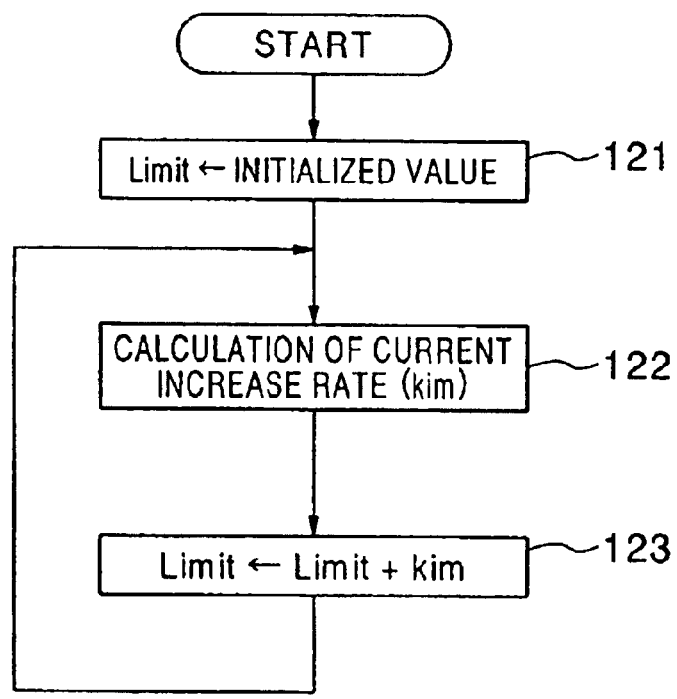
FIG. 6 is a flow chart depicting processing of a calculation of a maximum current limit value for the control apparatus of the electric power steering control system, according to Embodiment 1 of the present invention.

FIG. 6 is a flow chart depicting processing of the maximum current limit value calculation unit 109.

Next, explanation will be made of the maximum current limit value calculation unit 109. According to FIG. 6, at first when the control device 7 is activated at step 121, an initial value is set for the maximum current limit value (i.e., Limit). Next, at step 122 an the current increase rate (kim) is calculated; at step 123 the current increase rate (kim) is added to the maximum current limit value (i.e., Limit); and steps 122 to 123 are repeated thereafter.

Figure 7:
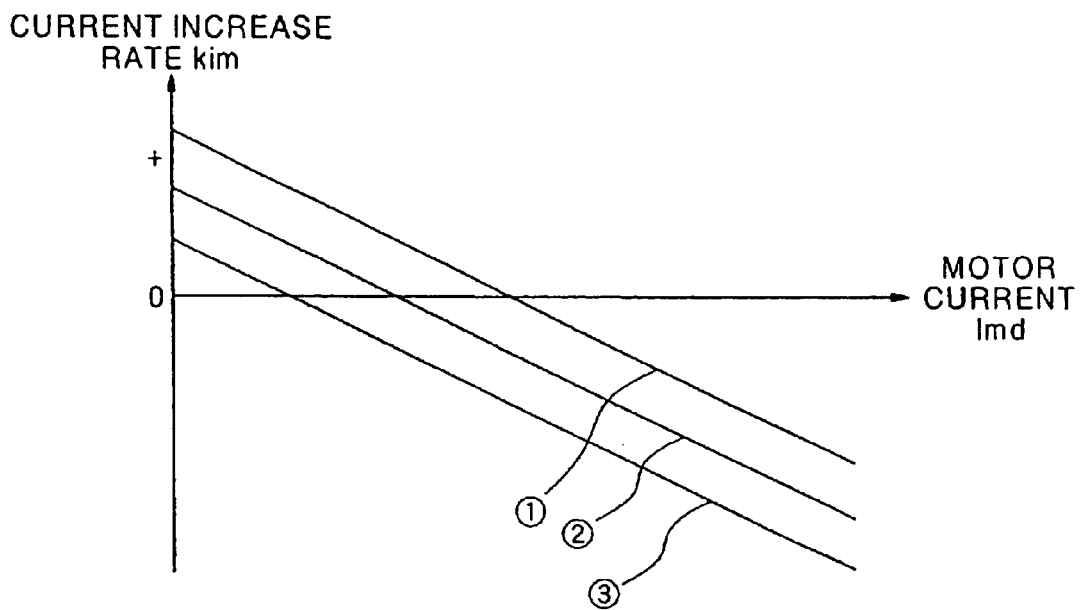
FIG. 7 is a diagram depicting a coefficient of a coefficient determining unit of the control apparatus in the electric power steering control system according to Embodiment 1 of the present invention.

FIG. 7 is a diagram depicting characteristics (i.e., coefficients) of the current increase rate of the maximum current limit value calculation unit.

At step 122 the characteristics of the current increase rate (kim) are as in FIG. 7 by the detected current of the motor (i.e., Imd). Further, the characteristic (i.e., coefficient) of the current increase rate (kim) is constructed such that when the temperature is low the coefficient is as indicated by (1) (n.b. the encircled numbers in the diagrams are represented in parenthesis in the specification for reasons of convenience), and as the temperature rises the coefficient changes to (2) and (3). It is the coefficient setting unit 108 which makes the coefficient change in accordance with the temperature.

Figure 8:
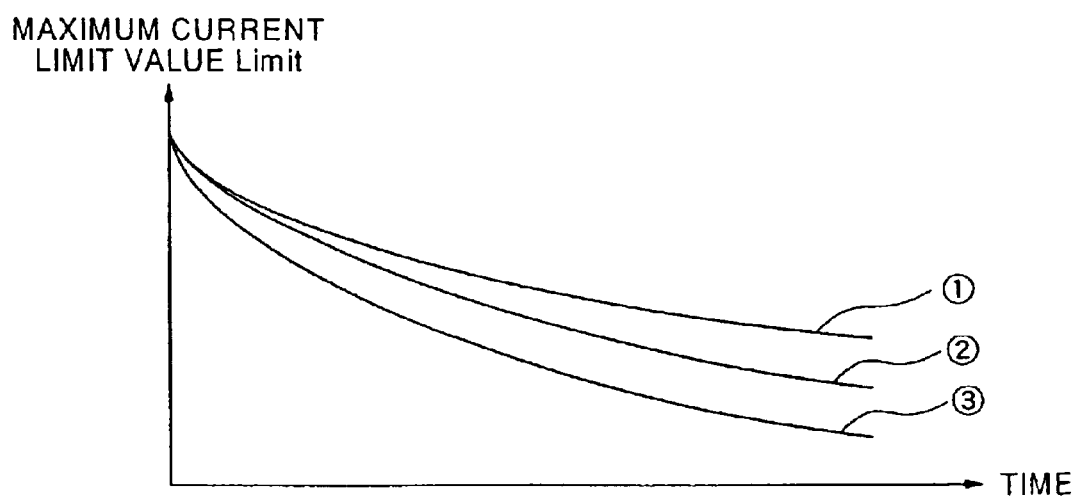
FIG. 8 is a diagram depicting an example of results of calculations by a maximum current limit value calculation unit of the control apparatus in the electric power steering control system according to Embodiment 1 of the present invention.

FIG. 8 is a diagram depicting a result (i.e., an attenuation characteristic) of the calculation performed by the maximum current limit value calculation unit. Note that this FIG. 8 depicts an example in which the coefficient does not change. When the detected temperature changes, smooth curved lines as shown in FIG. 8 are not produced.

According to the construction described above, the efficient setting unit 108 sets the coefficient based on a temperature Temp detected by means of the temperature sensor 75, and the maximum current limit value calculation unit 109 calculates the maximum current limit value Limit based on the coefficient set by the coefficient setting unit 108. When the handle is turned and held as it is in that position the maximum current limit value (i.e., Limit) attenuates as shown in FIG. 8 and limits the motor current. Accordingly, it becomes possible to prevent overheating of the motor 6 and the control device 7.

Further, when the coefficient is switched as shown in FIG. 7 (1)–(3) by means of the coefficient setting unit 108, the attenuation characteristics of the maximum current limit value also change as shown in FIG. 8 (1)–(3) such that the motor current is less at a time of high temperature (3) than at a time of low temperature (1). Accordingly, overheating prevention being adapted to the temperature becomes possible.

Embodiment 2

Explanation will now be made of an electric power steering control system according to Embodiment 2 of the present invention, making reference to the drawings.

Figure 9:
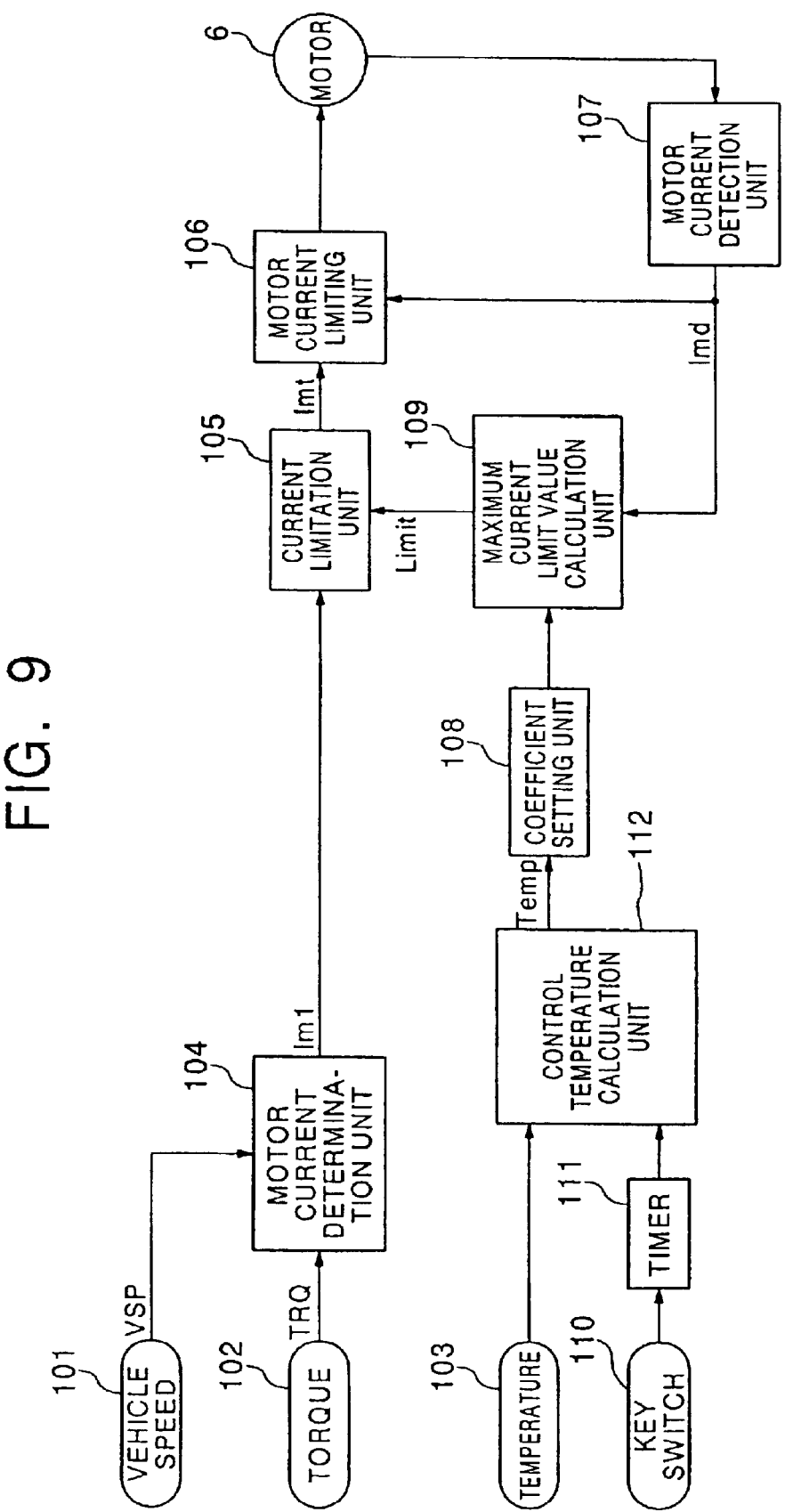
FIG. 9 is a diagram depicting a control block of a control apparatus in an electric power steering control system according to Embodiment 2 of the present invention.

In this Embodiment 2, the control block in FIG. 3 of the above-described Embodiment 1 is modified as shown in FIG. 9.

In FIG. 9, the same reference numerals perform the same operations as those of FIG. 3, so explanation thereof is omitted, and explanation will be made of other parts.

In FIG. 9, 110 is a key switch (signal); 111 is timer for measuring a duration of time from when the key switch 110 is turned on; and 112 is a control temperature calculation unit (i.e., a control temperature calculation section) for calculating the control temperature (i.e., Temp) in accordance with the temperature signal 103 and the timer 111.

Figure 10:
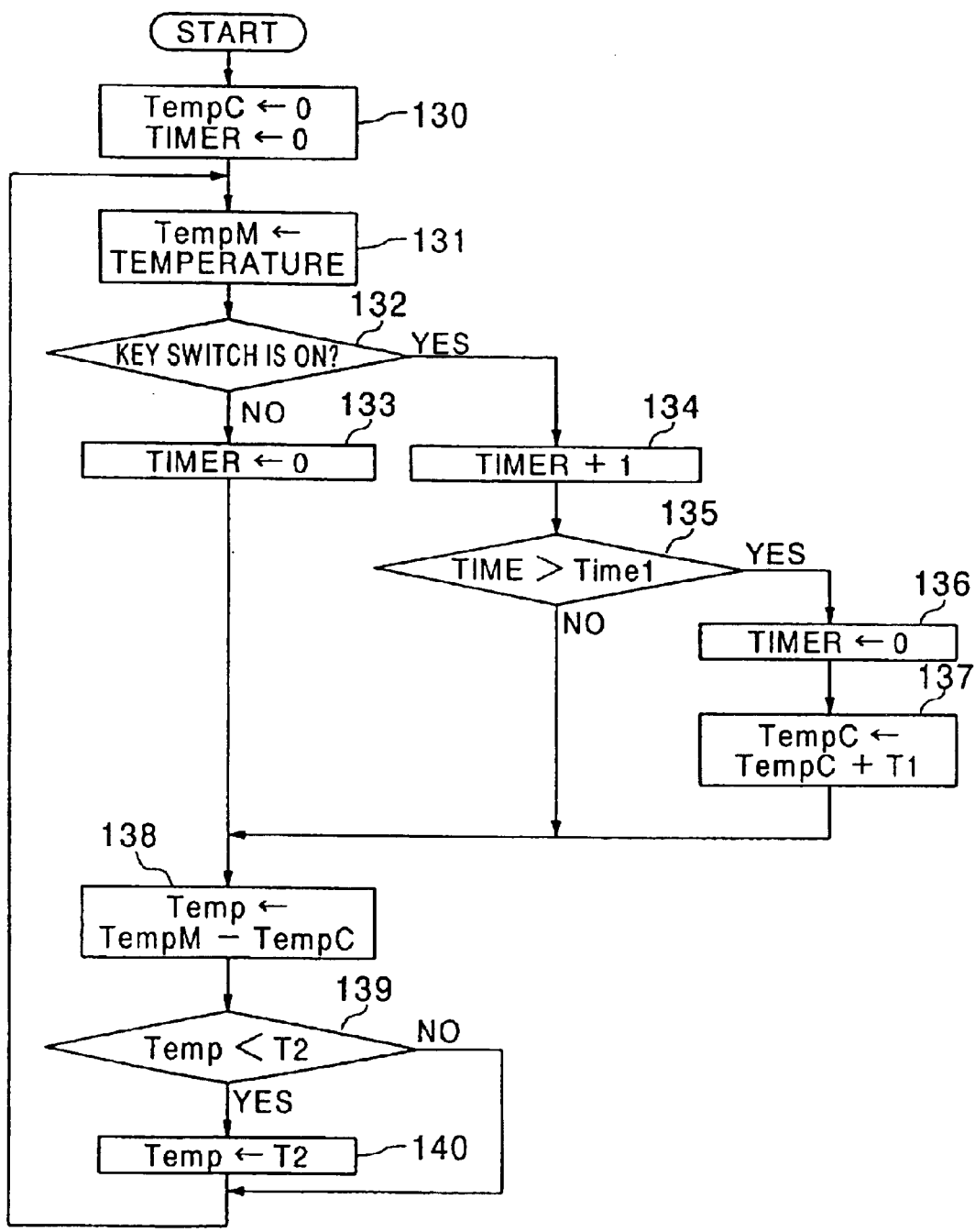
FIG. 10 is a flow chart depicting processing of a timer and a control temperature calculation unit of the control apparatus in the electric power steering control system according to Embodiment 2 of the present invention.

FIG. 10 is a flow chart depicting an operation of the control temperature calculation unit.

Explanation will now be made of operations of the temperature signal 103, the key switch 110, the timer 111, and the control temperature calculation unit 112, making use of FIG. 10.

In FIG. 10, first, at step 130 a temperature correction value TempC and the timer are initialized to zero (0).

Next, at step 131 the signal 103 from the temperature sensor 75 is assigned to TempM.

Next, at step 132 the status of the key switch 110 is determined, and if the key switch is off then step 133 is carried out. At step 133 the timer 111 for measuring the on time of the key switch is cleared to zero and the procedure advances to step 138.

In the case when the key switch 110 is on, at step 132 the procedure splits off to YES, and at step 134 the timer 111 is incremented. Next, at step 135 the value indicated by the timer 111 is compared against a predetermined value Time1, and in the case when the value of the timer 111 is smaller the procedure splits off to No and advances to step 138.

In the case when the timer 111 is greater than the predetermined value Time1, the procedure splits off to YES at step 135 and at step 136 the timer 111 is cleared to zero.

Then, at step 137 the predetermined value T1 is added to the temperature correction value TempC and the procedure advances to step 138.

At step 138, the temperature correction value TempC is subtracted from the TempM which has saved the signal 103 of the temperature sensor 75, and the result is assigned to the control temperature Temp.

After that, at step 139 the control temperature Temp is compared against the predetermined value T2, and in the case when the control temperature Temp is equal to or greater than the predetermined value T2 the procedure splits off to NO and returns to step 131. On the other hand, in the case when the control temperature Temp is less than the predetermined value T2 at step 139, the procedure splits off to YES and the predetermined value T2 is then assigned to the Temp at step 140.

Figure 11:
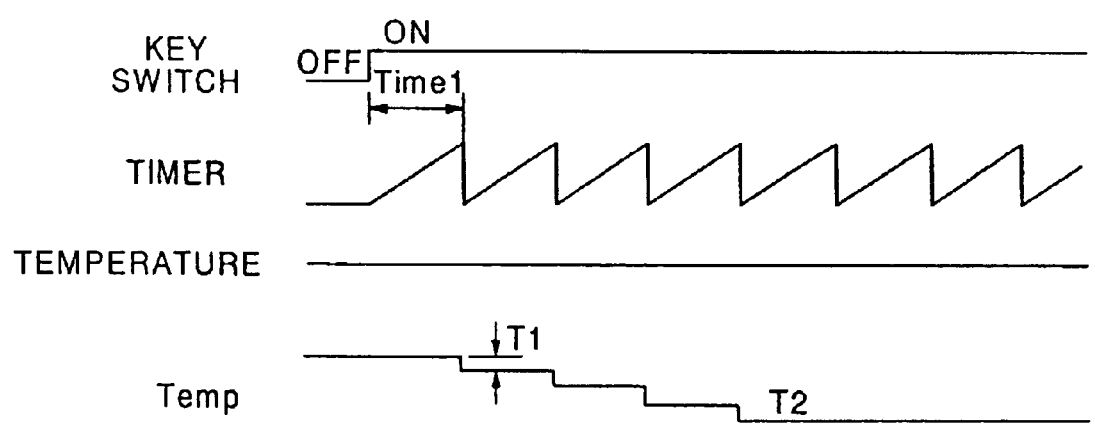
FIG. 11 is a timing chart depicting operation of the timer and the control temperature calculation unit of the control apparatus in the electric power steering control system according to Embodiment 2 of the present invention.

According to the processing as depicted in FIG. 10, the temperature correction value TempC is zero immediately after the activating of the control device 7; therefore, at step 138 the value TempM detected by means of the temperature sensor 75 is assigned to the control temperature Temp. After that, when the key switch 110 is turned on the temperature correction value TempC increases by increments of the predetermined value T1 for each time a predetermined duration of time Time1 elapses. At step 138 the control temperature Temp drops as this temperature correction value TempC increases. Note that at steps 139 and 140 the control temperature Temp is clipped so that it drops only as far as the predetermined value T2. This situation is depicted by the timing chart of FIG. 11.

Other parts of FIG. 9 operate similarly to those of Embodiment 1 described above. Therefore, the coefficient setting unit 108 sets the coefficient based on the control temperature Temp calculated by means of the control temperature calculation unit 112, and the maximum current limit value calculation unit 109 calculates the maximum current limit value Limit based on the coefficient set by the coefficient setting unit 108.

In the case of Embodiment 2 of the present invention, the operations as described above produce effects as follows. In a case when the temperature signal 103 detected by means of the temperature sensor 75 indicates a high temperature immediately after starting, the control temperature Temp gradually drops and the maximum current limit is relaxed in accordance with the elapsing of time from when the key switch was turned on. That is, even when a temperature inside the passenger compartment of the vehicle (i.e., an ambient temperature) rises, when the driver boards the vehicle the control anticipates that the driver will normally operate the air conditioning or open a window to lower the temperature inside the passenger compartment.

In a case when it is necessary due to constructional or other such considerations to attach the temperature sensor at a position which is apart from the place where the temperature must be measured, or also in a case when a heat-generating body or an entity which is relatively hot exists in the vicinity of the temperature sensor and it becomes difficult to detect the ambient heat of the place where the temperature must be measured, a construction such as that of Embodiment 2 enables the ambient temperature of the object portion to be predicted and the maximum current limit value to be calculated in accordance therewith.

Embodiment 3

Explanation will now be made of the electric power steering control system according to Embodiment 3 of the present invention, with reference to the drawings.

Figure 12:
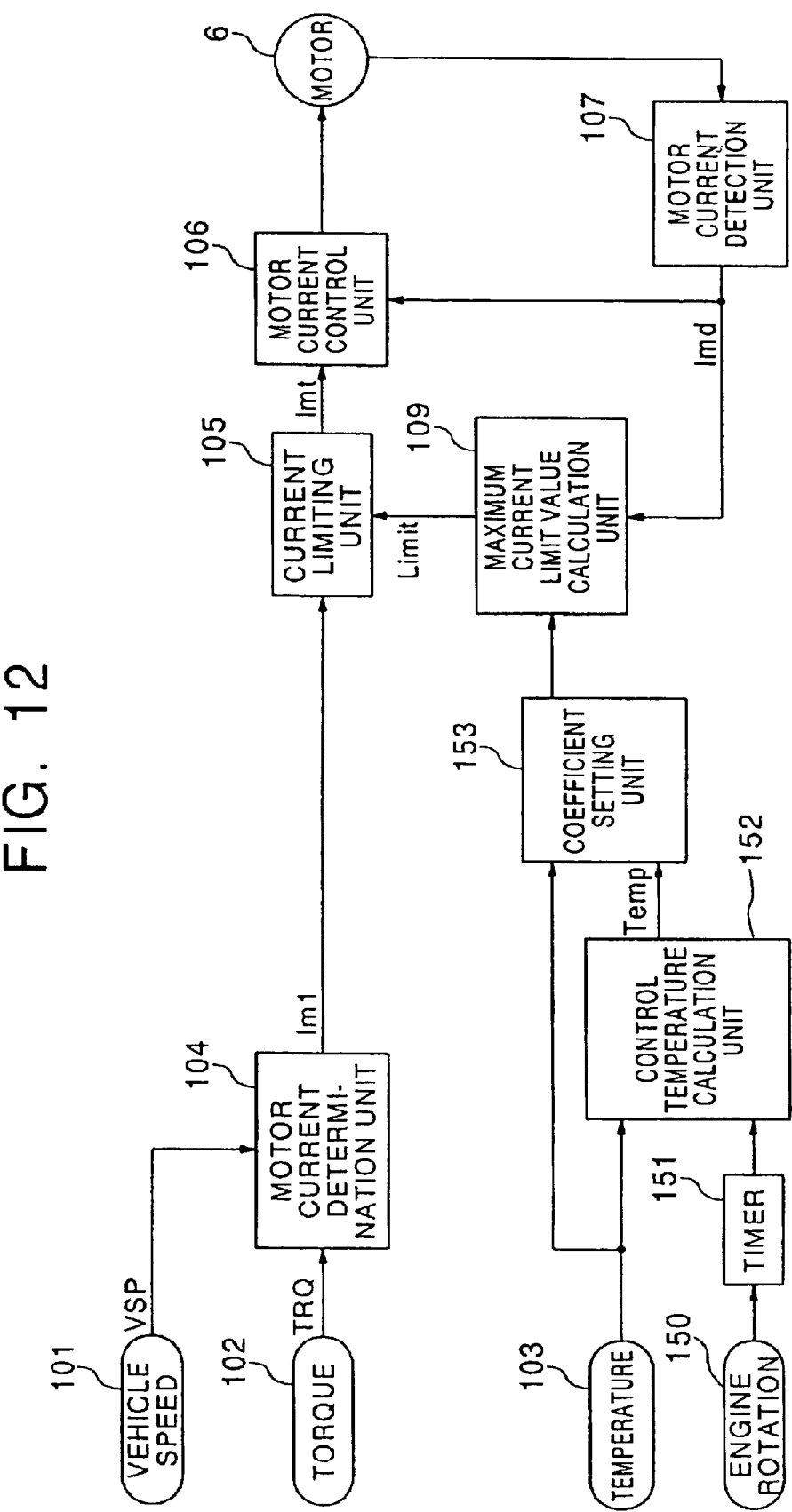
FIG. 12 is a diagram depicting a block control of an electric power steering control system according to Embodiment 3 of the present invention.

In this Embodiment 3, the control block in FIG. 3 of the above-described Embodiment 1 is modified as shown in FIG. 12.

In FIG. 12, the same reference numerals perform the same operations as those of FIG. 3, so explanation thereof is omitted, and explanation will be made of other parts.

In FIG. 12, 150 is the number of engine rotations obtained from the engine rotation signal 4 (i.e., the engine rotation detection section); 151 is a timer for measuring a duration of time from when the number of engine rotations 150 reaches a predetermined value or greater; 152 is a control temperature calculation unit for calculating the control temperature Temp in accordance with the temperature signal 103 and the timer 151; 153 is a coefficient setting unit for setting a coefficient of the maximum current limit value calculation unit 109 based on the control temperature Temp and the temperature signal 103.

Next, explanation will be made of operations of the temperature signal 103, the engine rotation signal 150, the timer 151 and the control temperature calculation unit 152, making use of FIG. 13.

Figure 13:
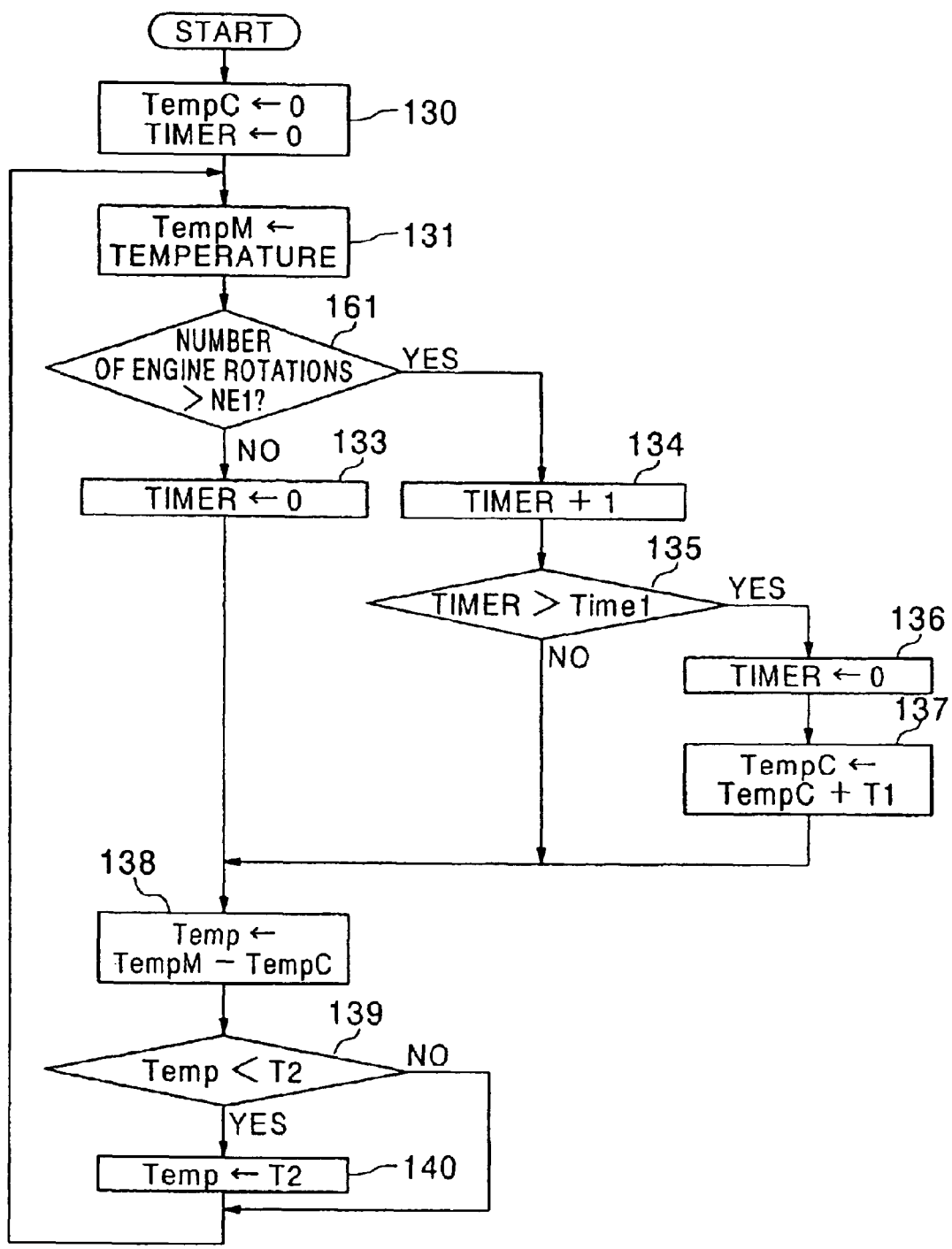
FIG. 13 is a flow chart depicting processing of a timer and a control temperature calculation unit of a control apparatus in the electric power steering control system according to Embodiment 3 of the present invention.

In FIG. 13, step 132 in FIG. 10 of Embodiment 2 has been changed to step 161. That is, the only change is that the on/off status of the key switch in FIG. 10 has been changed to the number of engine rotations being greater than/less than the predetermined value NE1.

Figure 14:
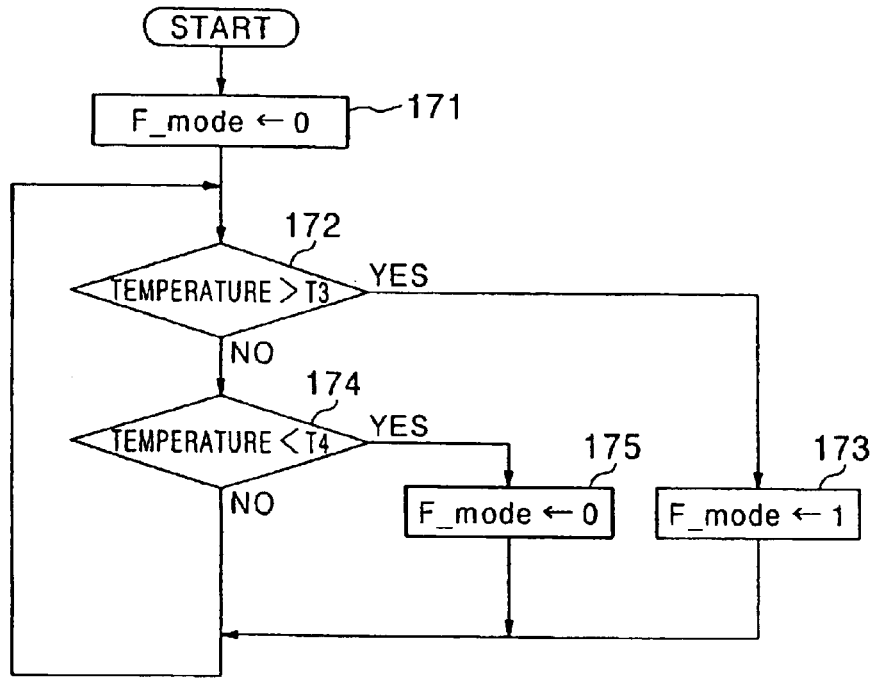
FIG. 14 is a flow chart depicting processing of a coefficient setting unit of the control apparatus in the electric power steering control system according to Embodiment 3 of the present invention.

Next, explanation will be made of the coefficient setting unit 153. The coefficient setting unit 153 has a flag for operating in accordance with to the temperature signal 103 and operates as shown in FIG. 14.

First, at step 171 a flag F_mode is cleared to 0. Next, the detected temperature is checked, and in the case when the detected temperature is greater than a predetermined value T3 the procedure splits off to YES at step 172 and at step 173 the flag F_mode is set to 1. When the temperature drops and is below the predetermined value T3 the procedure splits off to NO at step 172.

Next, at step 174 the detected temperature and the predetermined value T4 are compared, and if the detected temperature is greater than the predetermined value T4 then the procedure splits off to NO and returns to step 172. In the case when the detected temperature is less than the predetermined value T4 the procedure splits off to YES at step 174, and at step 175 the flag F_mode is cleared to 0, and thereafter, steps 172 to 175 are repeated.

At this point, when the predetermined values T3 and T4 are set such that T3>T4, when the temperature rises and exceeds T3 the flag F_mode is set to 1, and once it is so set, the flag F_mode is maintained at 1 until the temperature becomes less than the predetermined value T4, and when the temperature becomes less than the predetermined value T4 the flag F_mode is cleared to 0.

Figure 15:
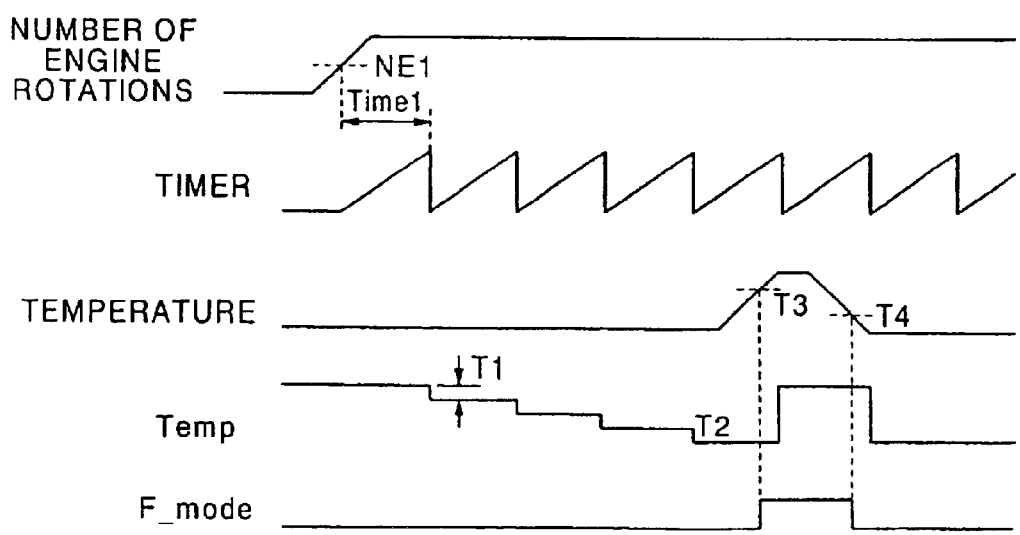
FIG. 15 is a timing chart depicting operation of the timer, the control temperature calculation unit and the coefficient setting unit of the control apparatus in the electric power steering control system according to Embodiment 3 of the present invention.

The operations of FIGS. 13 and 14 are depicted as a timing chart as shown in FIG. 15.

Figure 16:
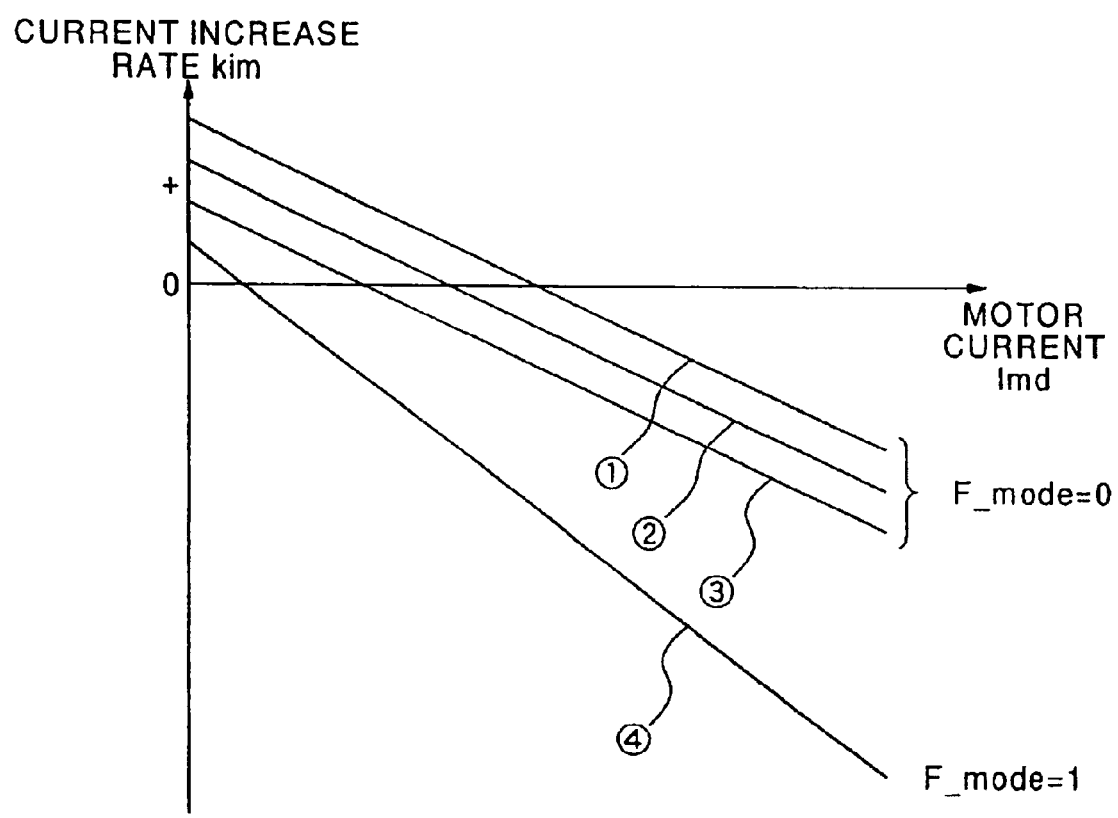
FIG. 16 is a diagram depicting a coefficient of the coefficient setting unit of the control apparatus in the electric power steering control system according to Embodiment 3 of the present invention.

Further, in a case when the flag F_mode is 0, the coefficient setting unit 153 sets the coefficients (1)–(3) in FIG. 16 in accordance with the control temperature Temp. When the control temperature is high the coefficient (3) is selected, and as the control temperature drops the coefficient is switched from (3) to (2) to (1). However, in the case when the flag F_mode is 1, the coefficient setting unit 153 is configured to select coefficient (4) regardless of the control temperature Temp. This produces a result of the following operations.

First, when the control device 7 activates the flag F_mode is cleared to 0 and the temperature detected by means of the temperature sensor 75 is set to as the control temperature Temp. The flag F_mode is 0, therefore, the coefficient setting unit 153 selects a coefficient from (1)–(3) in FIG. 16 in accordance with the control temperature Temp. Then, the maximum current limit value calculation unit 119 calculates the maximum current limit value Limit based on the coefficient set by the coefficient setting unit 153 and the motor current Imd, thus limiting the motor current by means of the current limiting unit 105.

After that the engine starts, and when the number of engine rotations 150 becomes greater than the predetermined value NE1 the timer 151 begins incrementing, and the control temperature Temp decreases by increments of the predetermined value T1 each time the predetermined time duration Time 1 elapses until the control temperature Temp drops to the predetermined value T2.

As this takes place, the coefficient selected by the coefficient setting unit 153 changes, and thus the maximum current limit is relaxed.

When use continues in this state and the value detected by the temperature sensor 75 rises due to some cause and exceeds the predetermined value T3, the flag F_mode is set to 1. When the flag F_mode becomes 1 the coefficient setting unit 153 selects the coefficient (4) in FIG. 16. This coefficient (4) is the coefficient which most quickly limits the motor current, so the rising of the temperature may be suppressed. Further, when the temperature drops and the temperature detected by the temperature sensor 75 becomes less than the predetermined value T4, the flag F_mode is cleared to 0 and the maximum current limit value calculation which is suitable for the original control temperature Temp is reset again.

Operations in accordance with Embodiment 3 are as described above; therefore, in this embodiment it is forecast that the ambient temperature (i.e., the temperature inside the passenger compartment) will drop due to operation of the air conditioner or such when the driver boards the vehicle and starts the engine, and the maximum current calculation is performed in accordance with that effect. Accordingly, unnecessary limitation of the current is not performed, so the overall control is pleasant in feeling. Additionally, in a case when the temperature rises and the temperature detected by target current temperature sensor 75 rises in contrast to the forecast that the temperature would drop, it is possible to force a switch of the control coefficient and urge the system to perform the calculation of the maximum current limit value so as to immediately suppress the rising of the temperature.

Embodiment 4

Explanation will now be made of an electric power steering control system according to Embodiment 4 of the present invention, making reference to the drawings.

Figure 17:
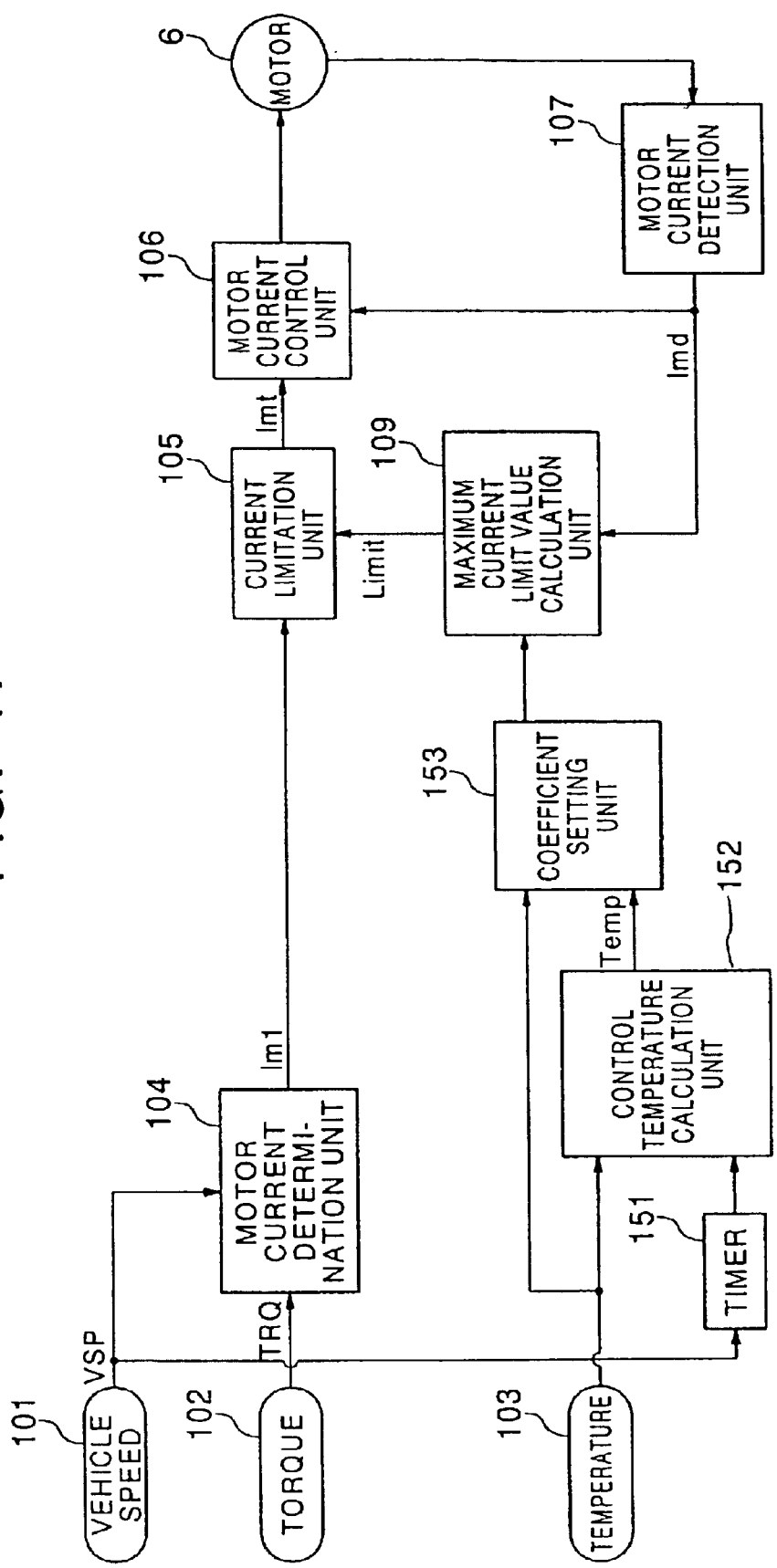
FIG. 17 is a diagram depicting a control block of a control apparatus of an electric power steering control system according to Embodiment 4 of the present invention.

FIG. 17 is a control block diagram of Embodiment 4, in which the engine rotation signal 150 of the control block of Embodiment 3 shown in FIG. 12 is changed to a vehicle speed 101.

Figure 18:
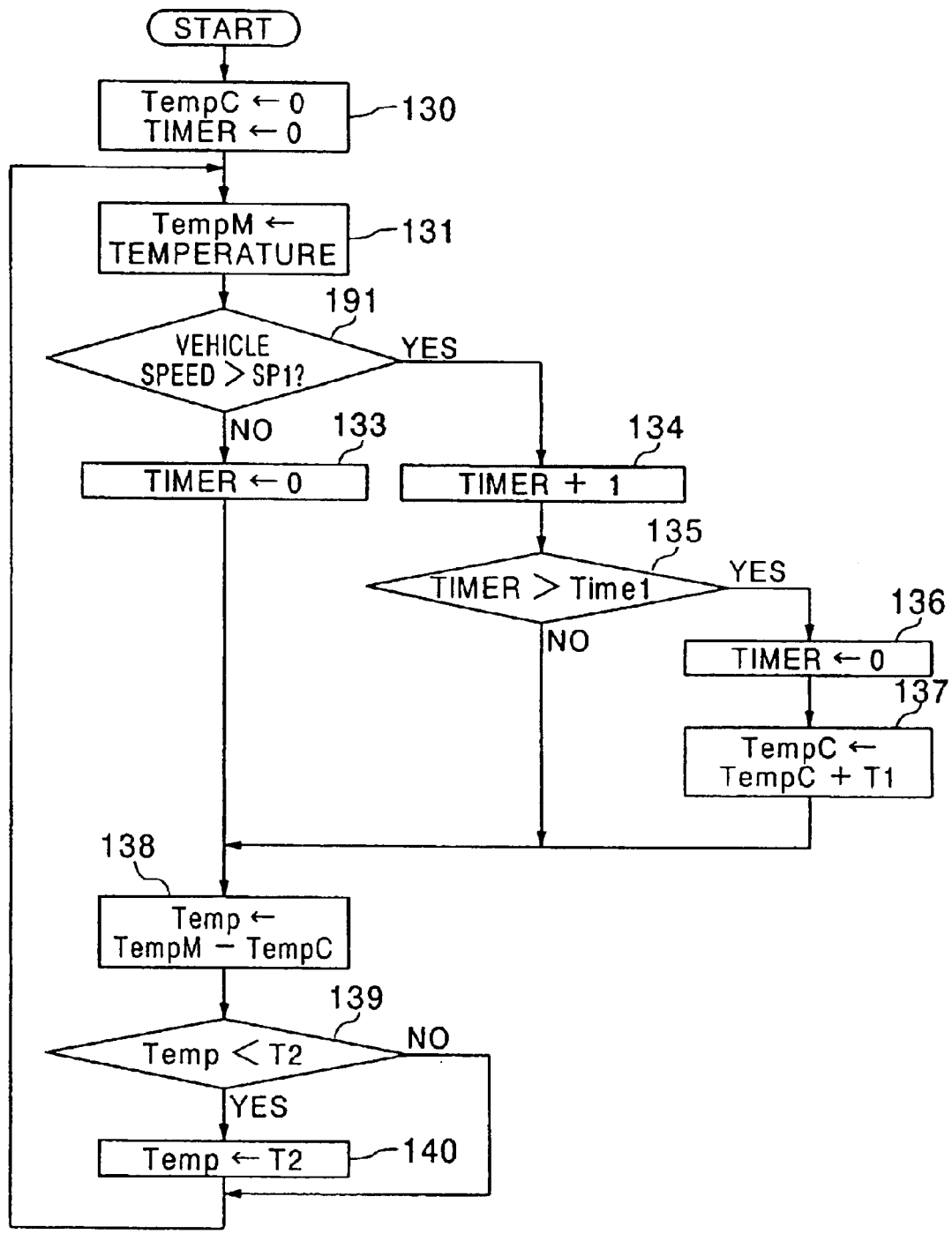
FIG. 18 is a flow chart depicting processing of a timer and a control temperature calculation unit of the control apparatus in the electric power steering control system, according to Embodiment 4 of the present invention.

With respect to the controls, only one a part thereof has been changed. That is, FIG. 18 is a flow chart of this Embodiment 4 in which the step 161 of Embodiment 3 shown in FIG. 13 has been changed as indicated at step 191.

Figure 19:
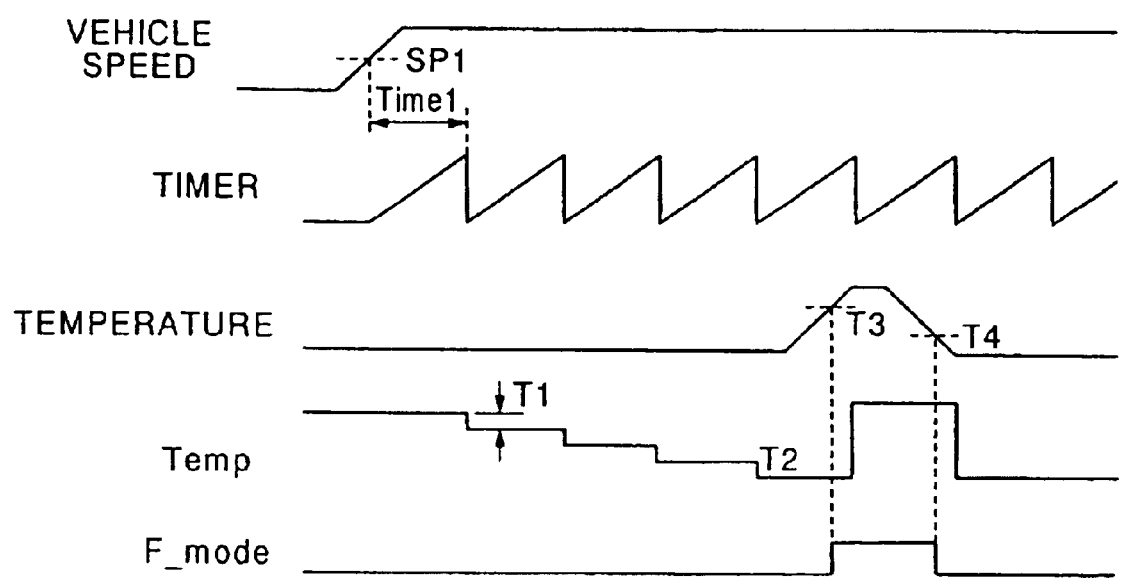
FIG. 19 is a timing chart of operations of the timer, the control temperature calculation unit and a coefficient setting unit of the control apparatus in the electric power steering control system, according to Embodiment 4 of the present invention.

Therefore, as for the operations thereof, in Embodiment 3 the timer begins operating from the time of the starting of the engine; however, in Embodiment 4 the timer only begins operating from the time when the vehicle speed 101 becomes greater than a predetermined value of SP1. Therefore, Embodiment 4 operates as shown in the timing chart of FIG. 19.

Operation in accordance with Embodiment 4 are as described above, so when a driver boards and begins to run the vehicle, a drop in the ambient temperature is predicted and a calculation of the maximum current limit is performed in accordance with this result. Accordingly, unnecessary limitation of the current is not performed, so the overall control is pleasant in feeling. Additionally, in a case when the temperature rises in contrast to the prediction of a drop in temperature such that the temperature detected by the temperature sensor 75 rises, it is possible to force a switch of the control coefficient, and cause the calculation of a maximum current limit value so as to immediately suppress the rise in the temperature.

Embodiment 5

Explanation will now be made of an electric power steering control system according to Embodiment 5 of the present invention, making reference to the drawings.

Figure 20:
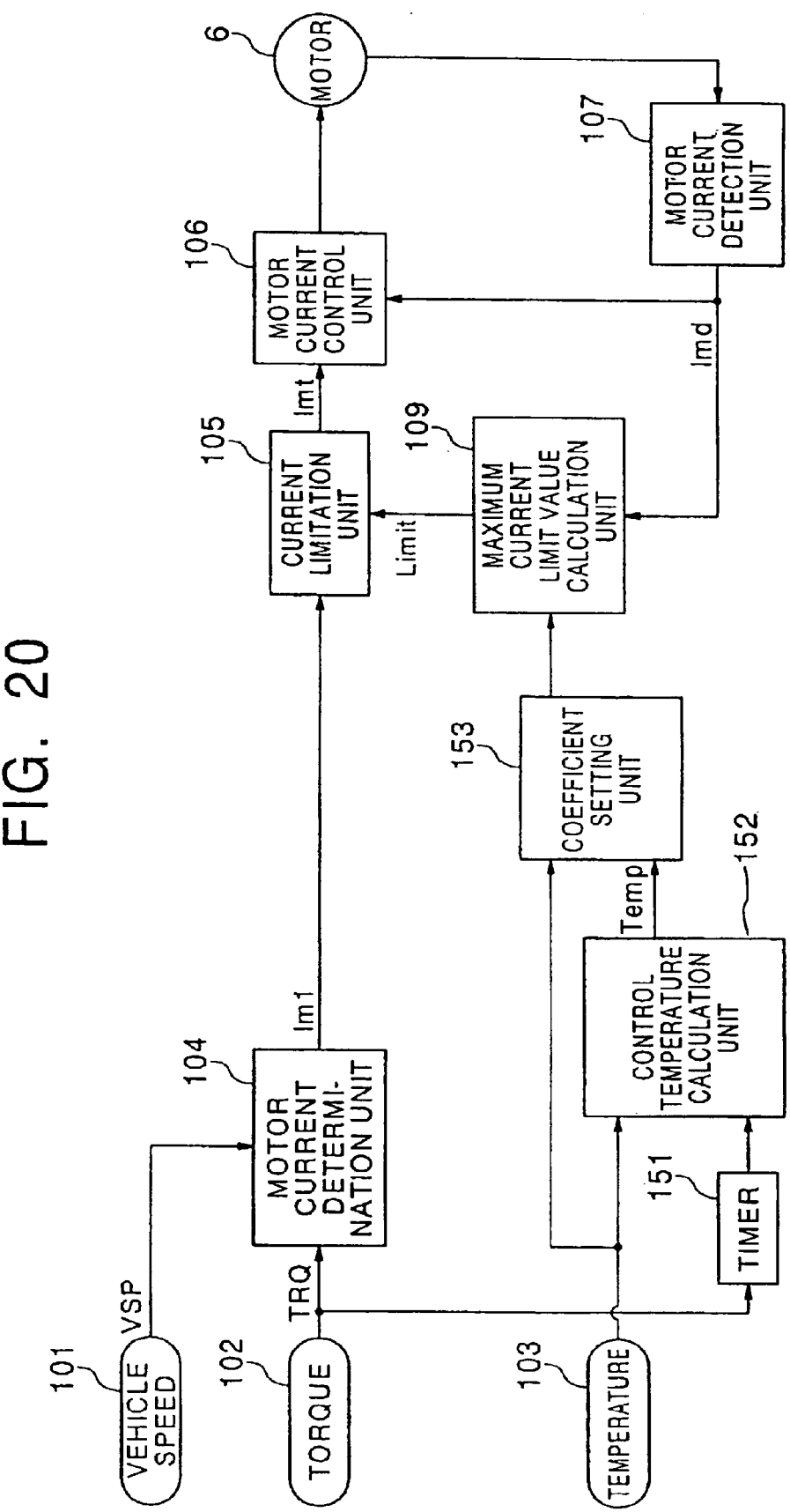
FIG. 20 is a diagram depicting a control block of a control apparatus of an electric power steering control system, according to Embodiment 5 of the present invention.

FIG. 20 is a control block diagram of Embodiment 5, in which the engine rotation signal 150 of the control block of Embodiment 3 shown in FIG. 12 is changed to a torque 102.

Next, explanation will be made of the controls making reference to FIG. 21 and FIG. 22. At step 201 in FIG. 21, the control temperature calculation unit 152 clears the flag F_TRQ to zero. Next, at step 202 an absolute value of the torque signal 102 and a predetermined value TRQ1 are compared against each other, and in the case when the absolute value of the torque is less than the predetermined value TRQ1 the procedure splits off to NO and returns to step 202. In the case when the absolute value of the torque is greater than the predetermined value TRQ1 the procedure splits off to YES, and at step 203 the flag F_TRQ is set to 1 and the procedure returns to step 202.

Next, explanation will be made of the flow chart of FIG. 22. In FIG. 22, step 161 of the flow chart of FIG. 13 of Embodiment 3 has been changed to step 204.

Figure 21:
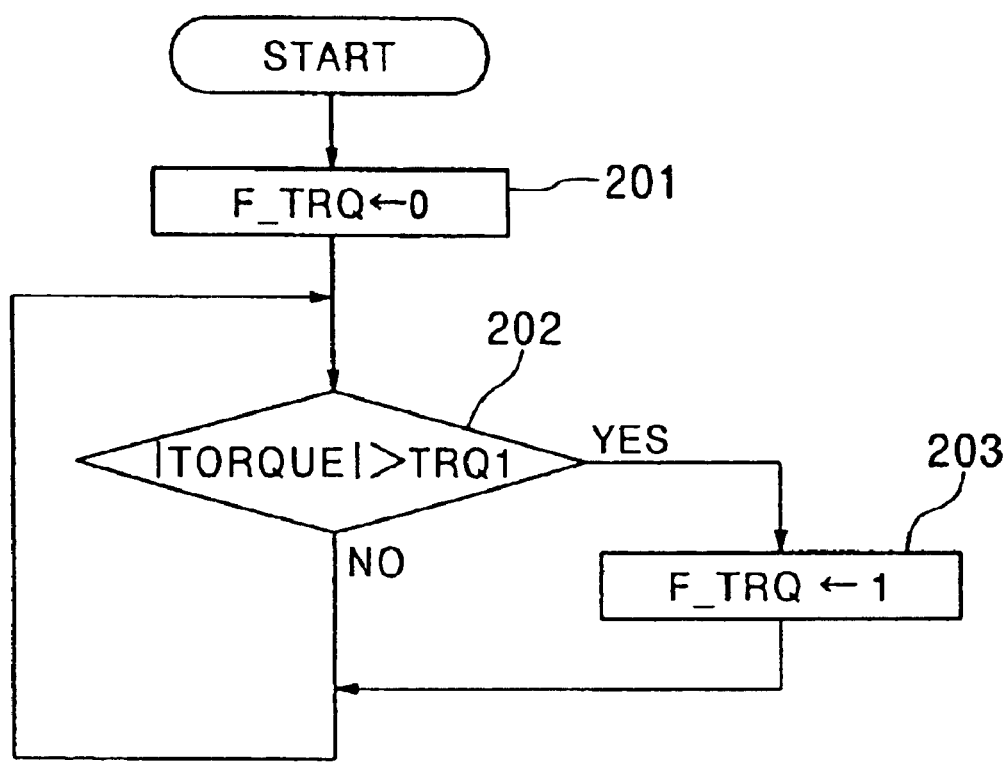
FIG. 21 is a flow chart depicting processing of a timer and a control temperature calculation unit of the control apparatus in the electric power steering control system, according to Embodiment 5 of the present invention.
Figure 22:
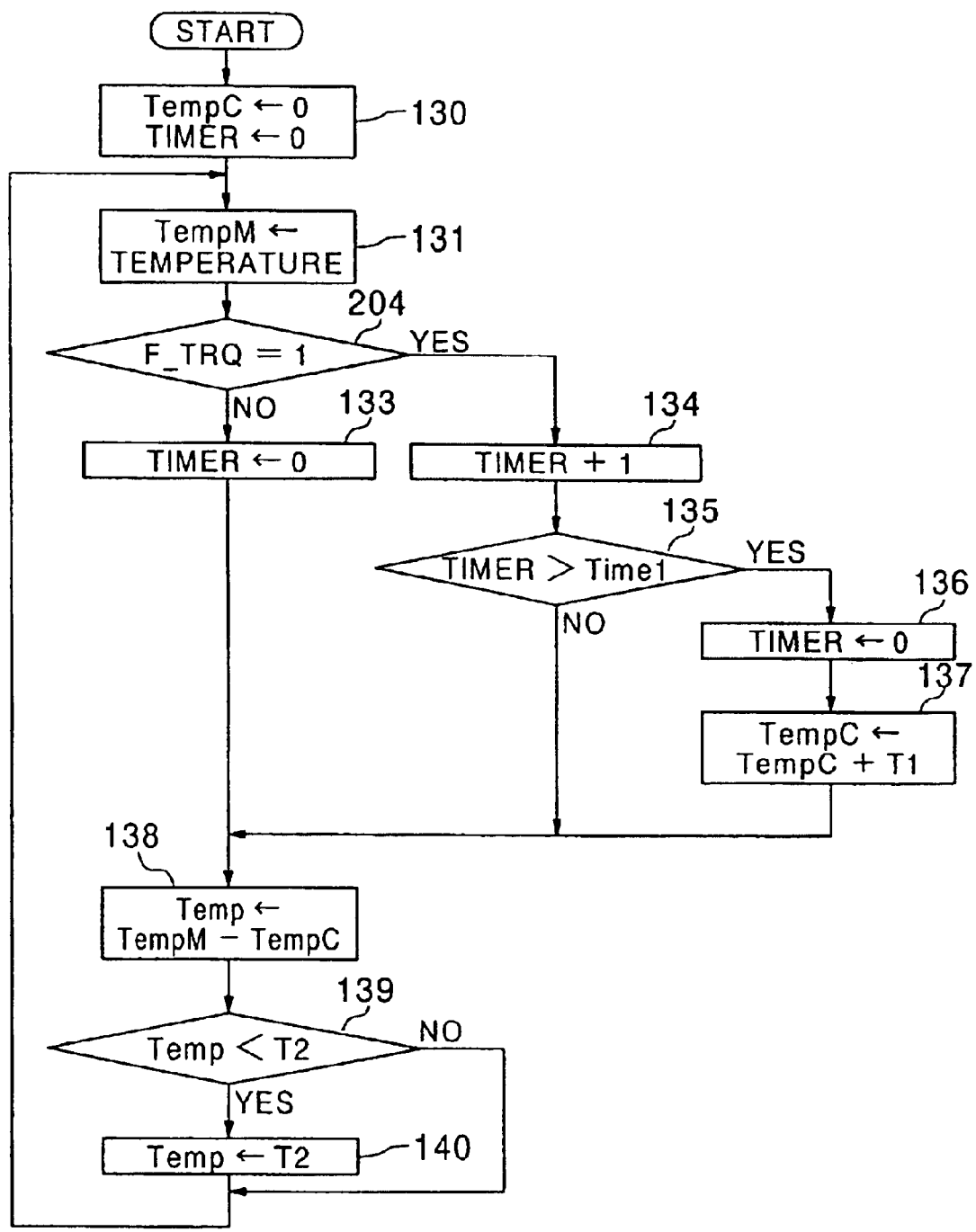
FIG. 22 is a flow chart depicting processing of the timer and the control temperature calculation unit of the control apparatus in the electric power steering control system, according to Embodiment 5 of the present invention.

Performing of control as depicted in FIG. 21 and FIG. 22 enables the following operation. Immediately after the control device 7 is activated the flag F_TRQ is in the cleared state of zero, so at step 204 the procedure splits off to NO and the timer 151 is turned to the cleared state of zero. After that the driver steers the handle 1, and when the absolute value of the torque becomes greater than the predetermined value TRQ1 the flag T_TRQ is set to 1 at step 203.

Figure 23:
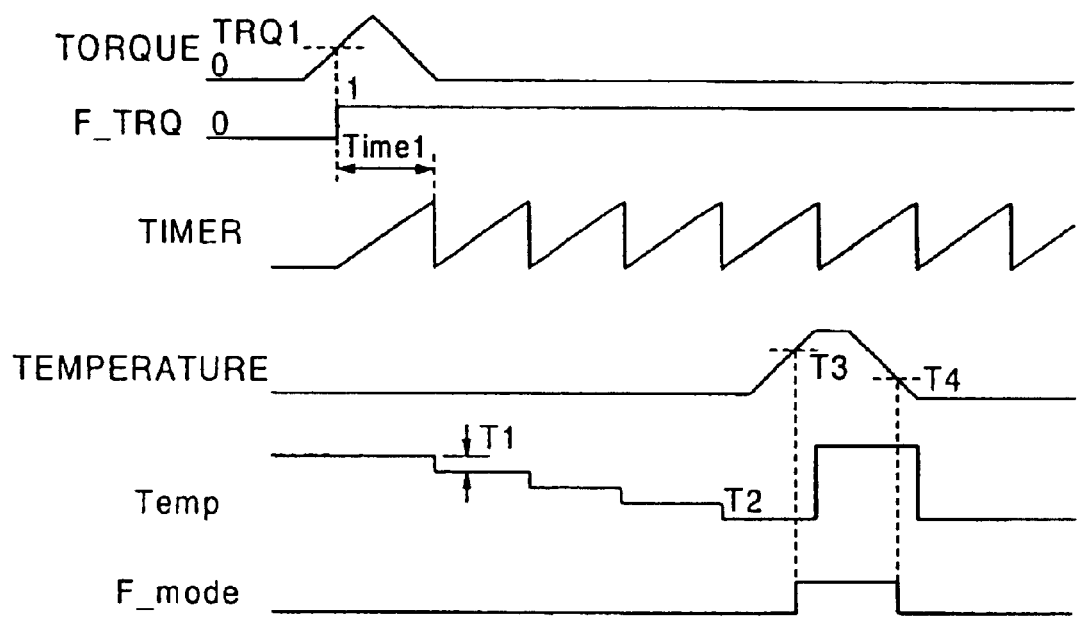
FIG. 23 is a timing chart depicting operations of the tier, the control temperature calculation unit and the coefficient setting unit of the control apparatus in the electric power steering control system, according to Embodiment 5 of the present invention.

Once the flag F_TRQ is set to 1, the flag F_TRQ remains set at 1 thereafter even if the absolute value of the torque drops below the predetermined value of TRQ1. When the flag F_TRQ is set to 1 the procedure splits off to YES at step 204, and the timer 151 performs its incremental operation. This enables operations as depicted in the timing chart of FIG. 23.

Operations according to Embodiment 5 are as described above; therefore, when the driver boards the vehicle, once he or she steers the handle a drop in the ambient temperature is predicted, and the calculation of the maximum current limit is performed in accordance with this result. Accordingly, unnecessary limitation of the current is not performed, so the control is pleasant in feeling. Additionally, in a case when the temperature rises in contrast to the prediction of a drop in temperature such that the temperature detected by the temperature sensor 75 rises, it is possible to force a switch of the control coefficient, and cause the calculation of a maximum current limit value so as to immediately suppress the rise in the temperature.

Embodiment 6

Explanation will now be made of an electric power steering control system according to Embodiment 6 of the present invention, making reference to the drawings.

Figure 24:
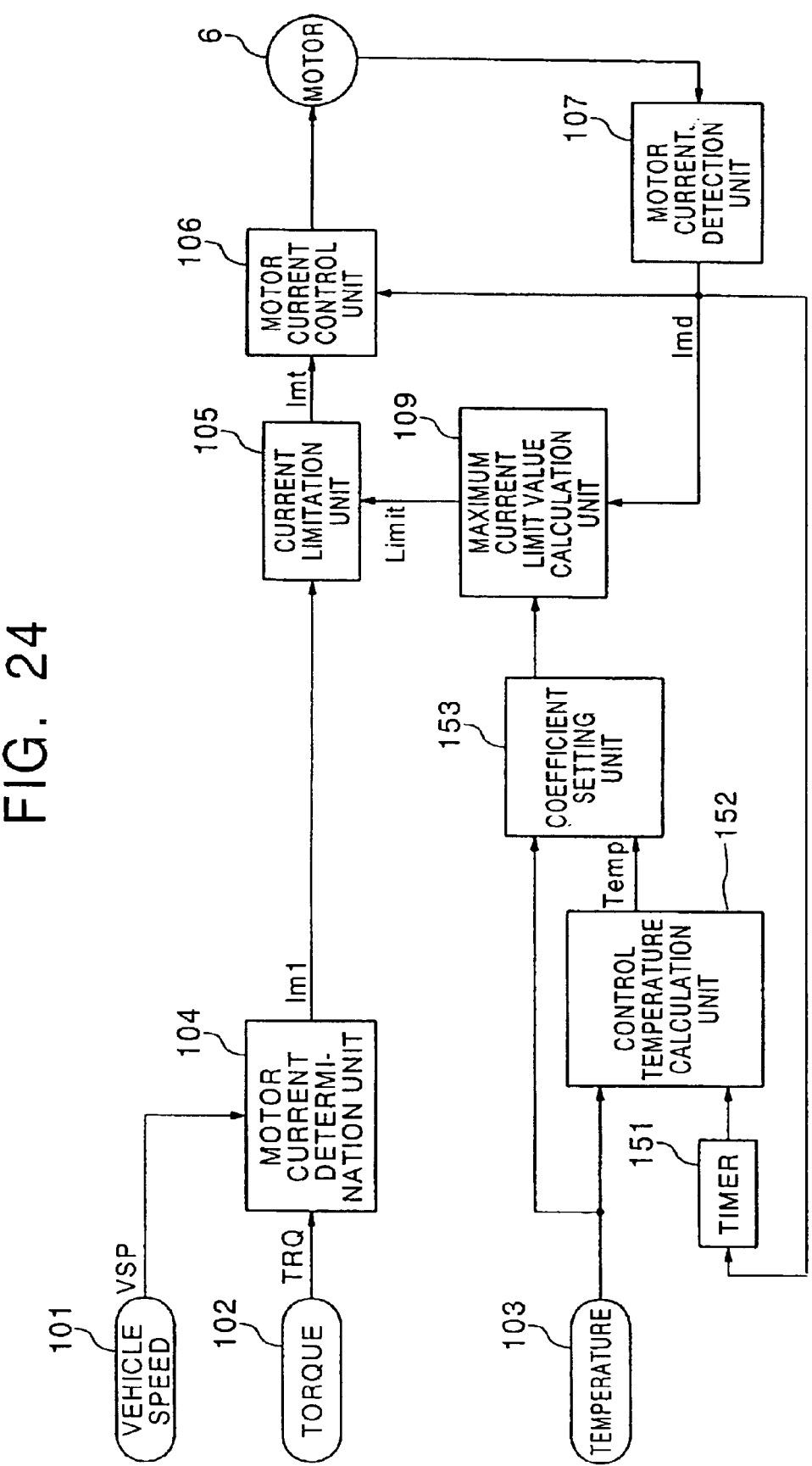
FIG. 24 is a diagram depicting a control block of a control apparatus of an electric power steering control system according to Embodiment 6 of the present invention.

FIG. 24 is a control block diagram of Embodiment 6, in which the engine rotation signal 150 of the control block of Embodiment 3 shown in FIG. 12 is changed to a motor current Imd.

Next, explanation will be made of operations making reference to FIG. 25 and FIG. 26. At step 211 in FIG. 25, the control temperature calculation unit 152 clears the flag F_Im to zero. Next, at step 212 the motor current Imd obtained through the timer 151 and a predetermined value Imd1 are compared against each other, and in the case when motor current Imd is less than the predetermined value Imd1 the procedure splits off to NO and returns to step 212. In the case when the motor current Imd is greater than the predetermined value Imd1 the procedure splits off to YES, and at step 213 the flag F_Im is set to 1 and the procedure returns to step 212.

Next, explanation will be made of the flow chart of FIG. 26. In FIG. 26, step 161 of the flow chart of FIG. 13 of Embodiment 3 has been changed to step 214.

Figure 25:
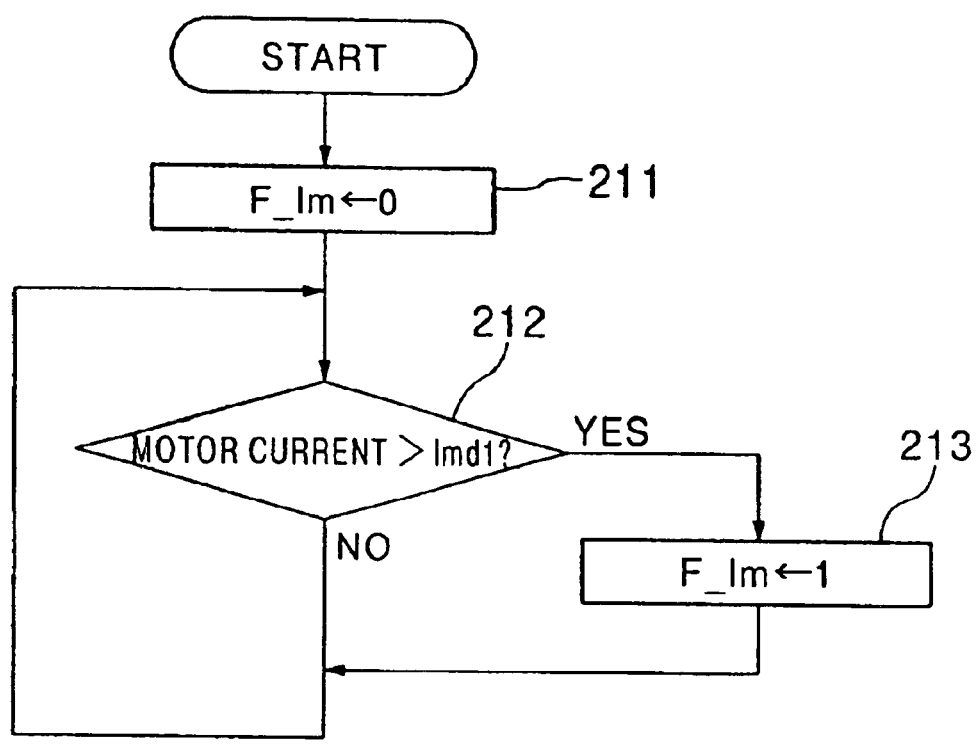
FIG. 25 is a flow chart depicting processing of a timer and a control temperature calculation unit of the control apparatus in the electric power steering control system, according to Embodiment 6 of the present invention.
Figure 26:
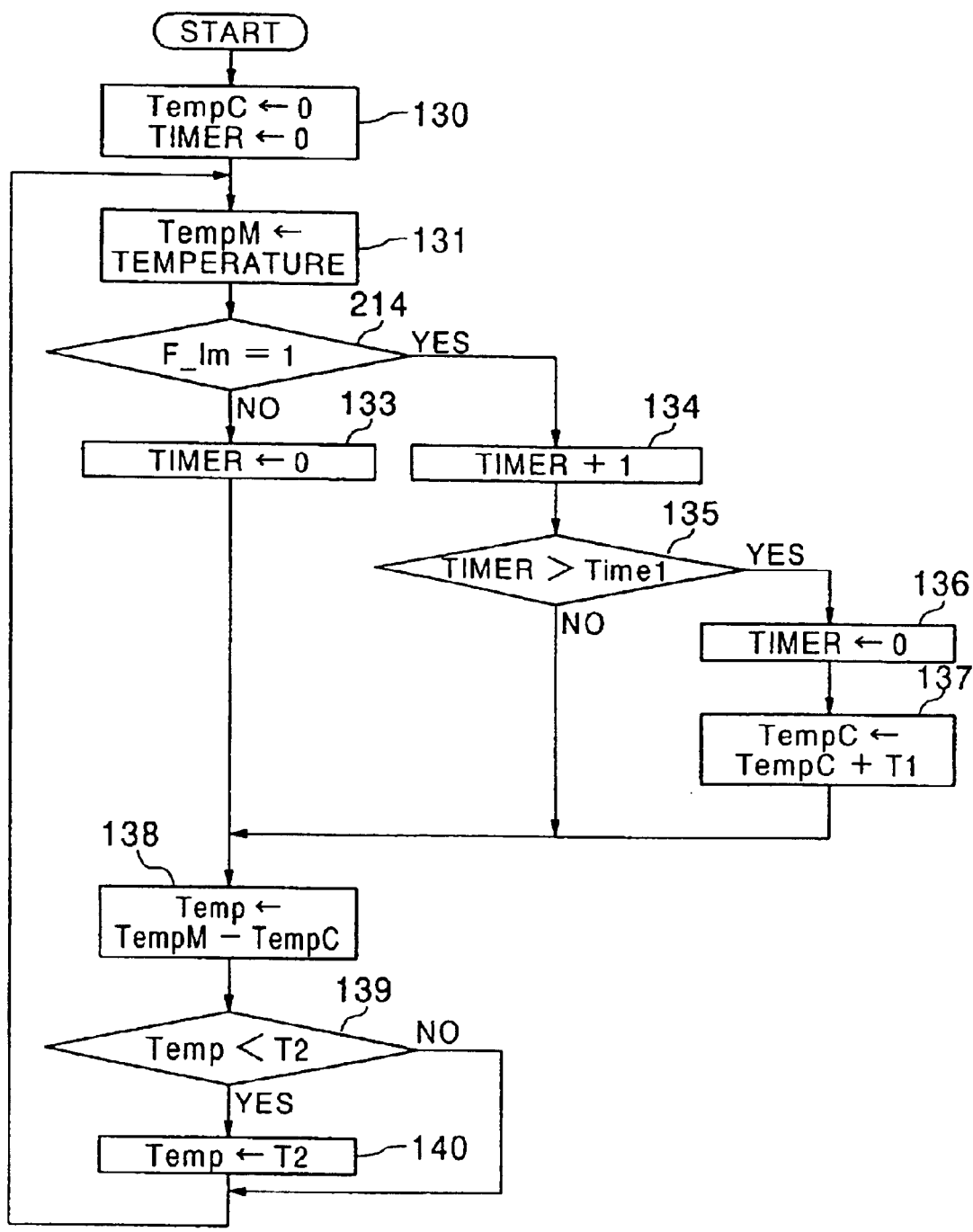
FIG. 26 is a flow chart depicting processing of the timer and the control temperature calculation unit of the control apparatus in the electric power steering control system, according to Embodiment 6 of the present invention.

Performing of control as depicted in FIG. 25 and FIG. 26 enables the following operation. Immediately after the control device 7 is activated the flag F_Im is in the cleared state of zero, so at step 214 the procedure splits off to NO and the timer 151 is turned to the cleared state of zero. After that the driver steers the handle 1, and when the motor current becomes greater than the predetermined value Imd1 the flag F_Im is set to 1 at step 213. Once the flag F_Im is set to 1, the flag F_Im remains set at 1 thereafter even if the motor current drops below the predetermined value Imd1.

Figure 27:
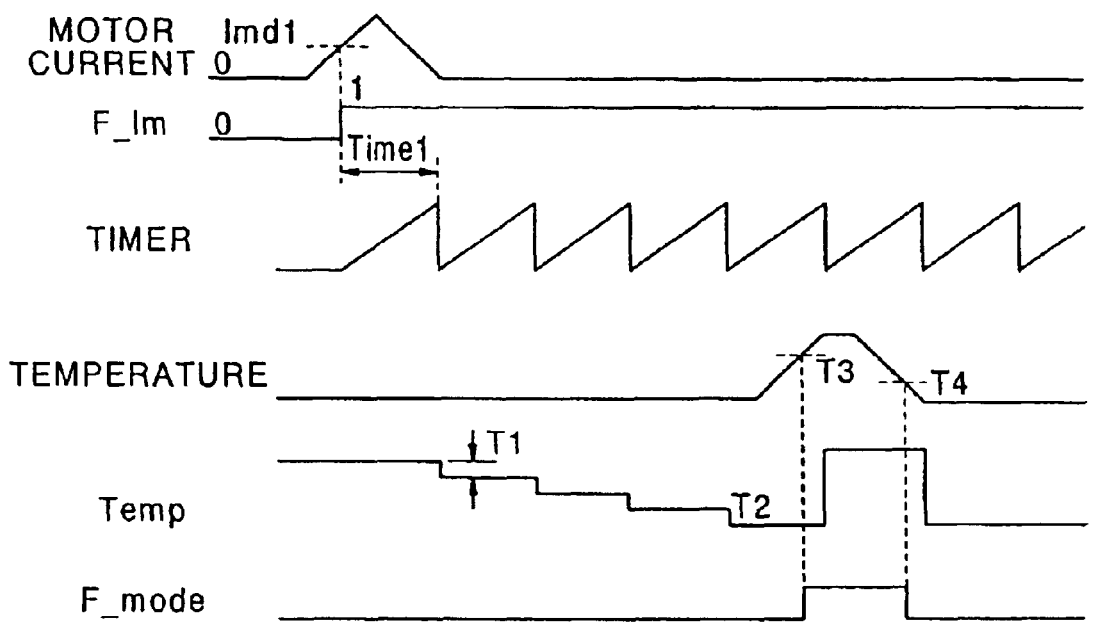
FIG. 27 is a timing chart depicting operations of the timer, the control temperature calculation unit and the coefficient setting unit of the control apparatus in the electric power steering control system, according to Embodiment 6 of the present invention.

When the flag F_Im is set to 1 the procedure splits off to YES at step 214, and the timer performs its incremental operation. Accordingly, this enables operations as depicted in the timing chart of FIG. 27.

Operations according to Embodiment 6 are as described above; therefore, when the driver boards the vehicle, once he or she steers the handle and the current is passed to the motor 6, a drop in the ambient temperature is predicted, and the calculation of the maximum current limit is performed in accordance with this result. Accordingly, unnecessary limitation of the current is not performed, so the control is pleasant in feeling. Additionally, in a case when the temperature rises in contrast to the prediction of a drop in temperature such that the temperature detected by the temperature sensor 75 rises, it is possible to force a switch of the control coefficient, and cause the calculation of a maximum current limit value so as to immediately suppress the rise in the temperature. Further, in Embodiment 6 the detected current of Imd is used for the motor current; however, an equivalent effect may be obtained by using the target current Iml or Imt shown in FIG. 3 as well.

Embodiment 7

Explanation will now be made of an electric power steering control system according to Embodiment 7 of the present invention, making reference to the drawings.

The control block diagram of this Embodiment 7 is the same as the diagram used in connection with the above-mentioned Embodiment 1.

In operation, as well, Embodiment 7 differs from Embodiment 1 only with respect to temperature detection 103.

Figure 28:
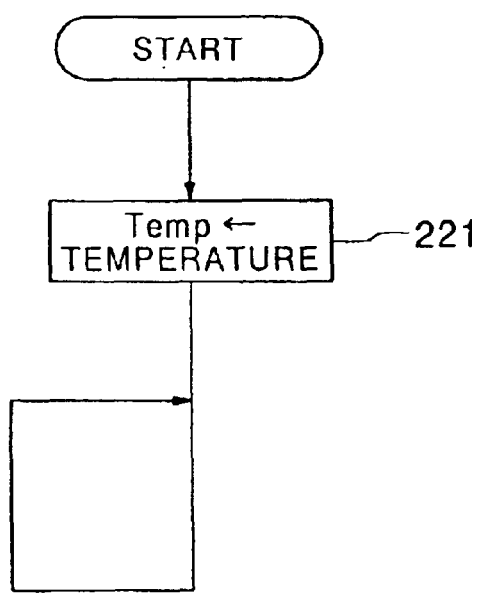
FIG. 28 is a flow chart depicting processing of a coefficient setting unit of a control apparatus of an electric power steering control system according to Embodiment 7 of the present invention.

Explanation will be made of the temperature detection, making reference to FIG. 28. In FIG. 28, when the control device 7 is activated the coefficient setting unit 108 first saves as the Temp the temperature detected at step 221. After that, this detected temperature Temp which has been saved is then held. This manner of construction enables the coefficient setting unit 108 to set the coefficient based on the temperature at the time of the activation of the control device 7.

A construction such as the one described above enables the following effects. The control device 7 has each of the circuits shown in FIG. 2 other than the motor drive circuit 77 built therein. Due to this, when an electrical power source is turned on for the control device 7 the temperature of the control device 7 rises even if the motor current is not flown (hereinafter, this is referred to as self-generation of heat). When the temperature sensor 75 is installed to the inside portion of the control device 7 the temperature detected by the temperature sensor 75 rises due to the self-generation of heat, and it becomes impossible to accurately detect the ambient temperature.

According to Embodiment 7 the coefficient is set using the temperature immediately after activation. Immediately after activation there is almost no self-generation of heat; therefore, the detected temperature is the same as the ambient temperature. Therefore, it becomes possible to set the coefficient in accordance with the ambient temperature.

According to Embodiment 7 the temperature that was measured once at the time of activation is held; however, it is also possible to hold a value of an average temperature during a fixed period of time after activation when the influence of the self-generation of heat is small, and the coefficient for the calculation of the maximum current limit value may be set according to this held temperature.

Embodiment 8

Explanation will be now be made of an electric power steering control system according to Embodiment 8 of the present invention, making reference to the drawings.

Figure 29:
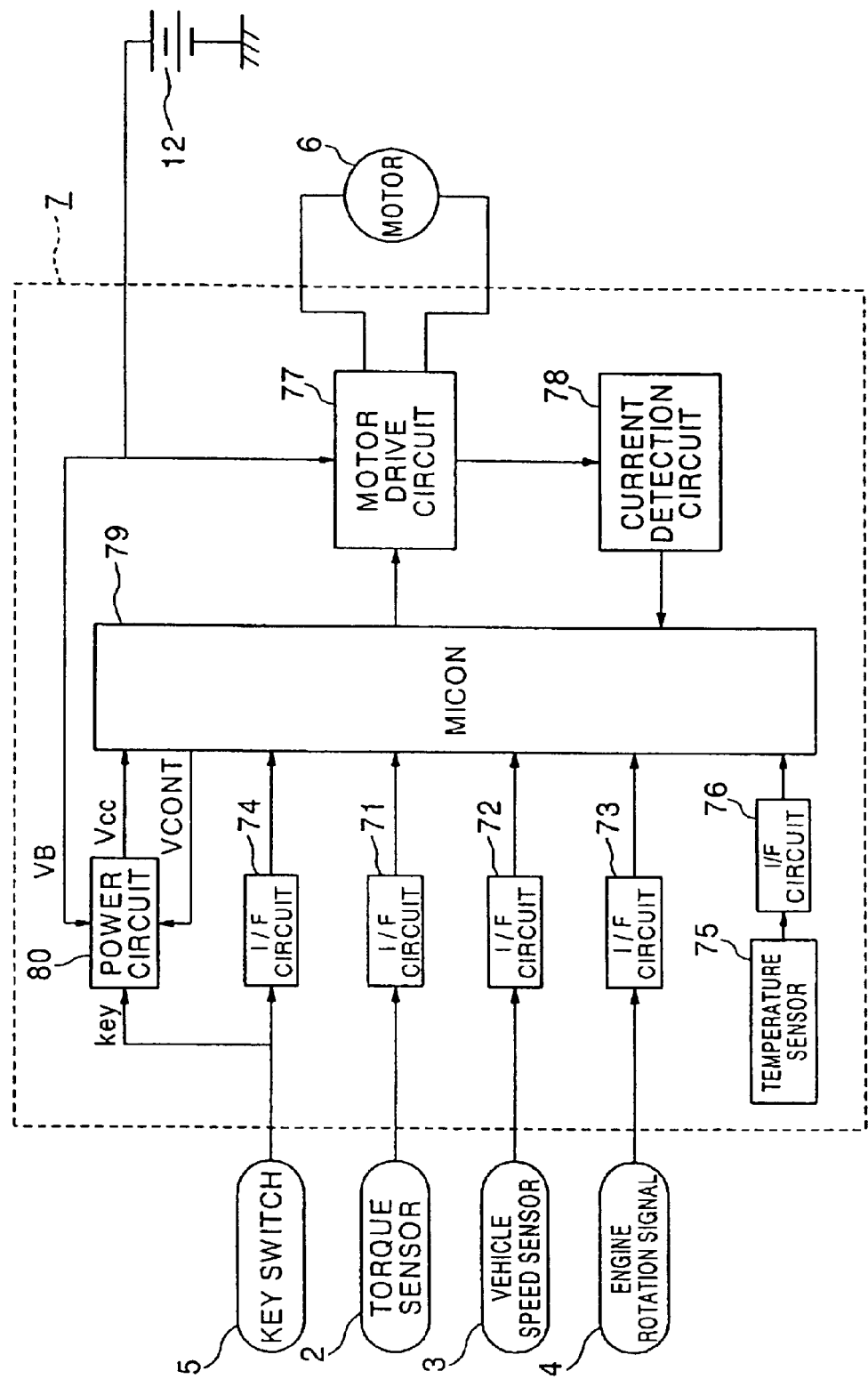
FIG. 29 is a diagram depicting a construction of a control apparatus of an electric power steering control system according to Embodiment 8 of the present invention.

FIG. 29 is a diagram depicting a construction of a control apparatus according to Embodiment 8 of the present invention. In this diagram the same reference numerals as those in FIG. 2 refer to parts which are the same as in Embodiment 1; therefore, explanation will be made of parts other than these.

In FIG. 29 reference numeral 80 is a power circuit (a part of a power supply holding unit).

Figure 30:
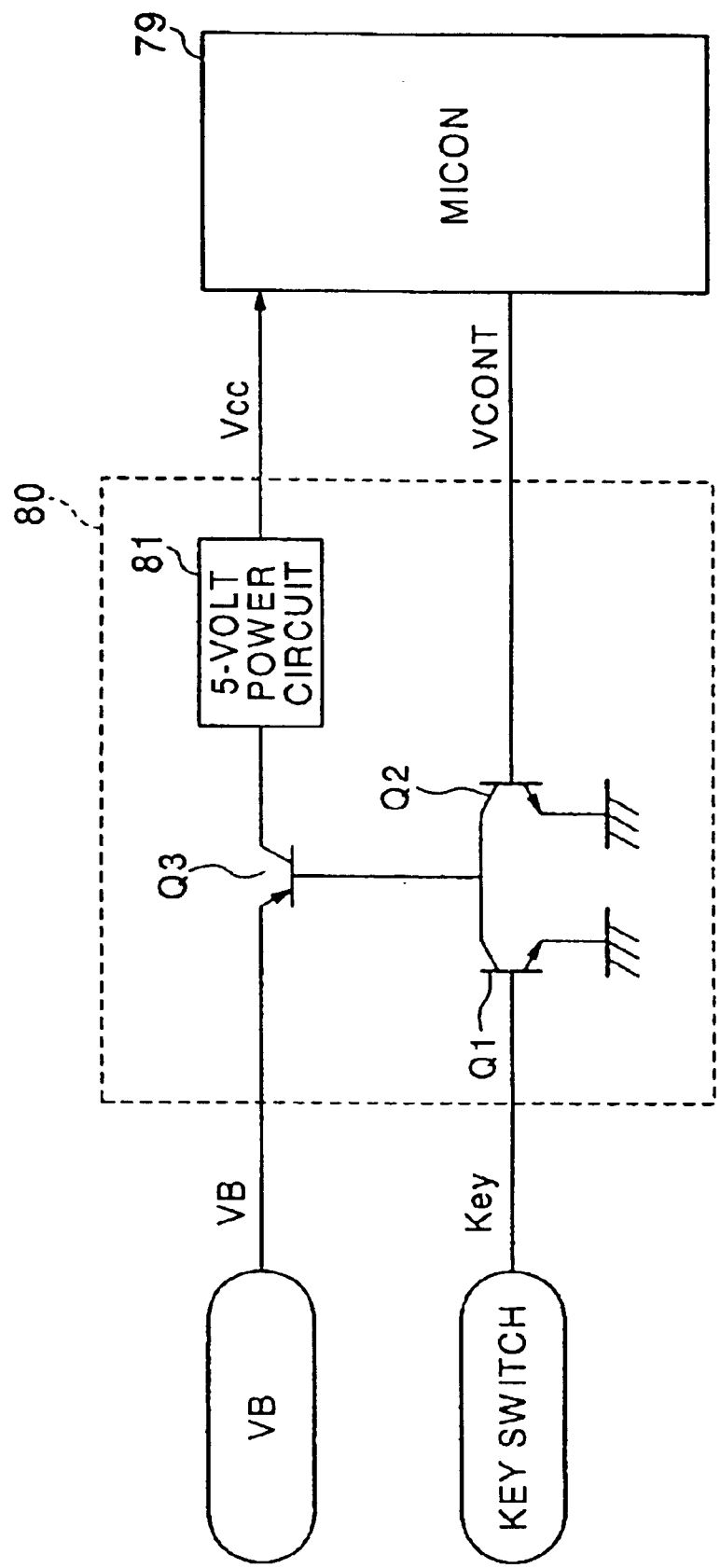
FIG. 30 is a diagram depicting a construction of a power circuit of the control apparatus in the electric power steering control system according to Embodiment 8 of the present invention.

FIG. 30 is a diagram depicting an interior construction of the current according to Embodiment 8.

In FIG. 30, Q1, Q2 and Q3 are transistors, and 81 is a 5-volt power circuit for generating a steady 5 volts of voltage from a battery voltage VB (12 volts) obtained through the transistor Q3.

A construction such as that of FIG. 30 enables a key switch 5 to turn on, and when the transistor Q1 is turned on or the transistor Q2 is turned on by means of a signal (VCONT) outputted from the micon 79, the transistor Q3 is turned on and the battery voltage VB is supplied to the 5-volt power circuit 81. Accordingly, it becomes possible for the 5-volt power circuit 81 to supply 5 volts of electrical voltage Vcc to the micon 79.

Next, explanation will be made of controls of the power circuit 80, making reference to the flow chart of FIG. 31. In this figure, at step 231 the power supply holding unit (not shown; i.e., the part of the power supply holding section) inside the micon 79 performs an on/off determination of the key switch 5 based on information outputted from the key switch I/F circuit in FIG. 29. If the key switch 5 is on, then the procedure splits off to YES at step 231. After splitting off to YES at step 231, the VCONT signal being outputted from the micon 79 is set to high at step 234 and the transistor Q2 is turned on. After that the procedure returns to step 231.

On the other hand, when the key switch 5 is off at step 231 the procedure splits off to NO. Next, at step 232 the value detected by the temperature sensor 75 and a predetermined value T5 are compared against each other, and in the case when the detected temperature is greater than the predetermined value T5 the procedure splits off to YES and the transistor Q2 is turned on at step 234. In the case when the detected temperature is less than the predetermined value T5 the procedure splits off to NO at step 232 and the transistor Q2 is turned off at step 233. After that, the procedure returns to step 231 and the same processing is repeated.

According to the construction described above, first, when the key switch 5 is turned on the transistor Q1 is turned on, and due to this the transistor Q3 is turned on; therefore, the battery voltage VB is supplied to the 5-volt power circuit 81, and when the 5-volt electrical power source Vcc is supplied to the micon 79 the micon 79 is activated. When the micon 79 is activated the processing depicted in FIG. 31 is carried out. At this point, the key switch 5 is in the on state, so according to the processing in FIG. 31 the transistor Q2 is turned on. Next, when the key switch 5 is turned off the transistor Q1 is turned off; however, the micon 79 has already turned the transistor Q2 on, so the transistor Q3 is in the on state. Since the transistor Q3 is in the on state the power supply is provided to the micon 79 and it is possible for the micon 79 to continue operating.

In other words, after the key switch 5 is turned of f, the power supply holding section, which is constructed of the power circuit 80 and the power supply holding unit inside the micon 79, holds the electrical source Vcc (5 volts) for the micon 79 until the temperature detected by the temperature sensor 75 drops below the predetermined value T5.

Although detailed depiction thereof is not made, it is normal to stop the motor drive after the key switch is turned off, and therefore, the temperature of the control device 7 drops. When the temperature of the control device 7 drops the temperature detected by the temperature sensor 75 also drops accordingly. When this temperature drops below the predetermined value T5 the procedure splits off to NO at step 232 of FIG. 31, and at step 233, Q2 is turned off. The key switch 5 is already turned off and the transistor Q1 is already in the off state; therefore, when the transistor Q2 turns off this causes the transistor Q3 to turn off. The power supply to the micon 79 is stopped and the control device 7 stops completely.

When Embodiment 8 is joined together with Embodiment 3, for example, the following effects are obtained. According to Embodiment 3, when the engine starts it is considered that the driver has boarded the vehicle, and the process is performed for gradually lowering the control temperature Temp. Accordingly, even in the case when the temperature detected by the temperature sensor 75 is high the control temperature Temp is dropping. Therefore, the limit set by the maximum current limit value calculation is relaxed, and good electrical power steering may be realized. However, when the key switch 5 is turned off while the temperature detected by the temperature sensor 75 is still high and the electrical source of the control device 7 is cut off and then the system is immediately reactivated, the micon 79 performs processing once again from the beginning Accordingly, control is started once again beginning with the high temperature detected by the temperature sensor 75, which is not desirable.

However, when joined together with Embodiment 8, the control device 7 continues performing control when the temperature detected by the temperature sensor 75 is still high after the key switch is turned off. Even if the key switch is turned off and then immediately turned on, the control device 7 does not perform processing again from the beginning. Therefore, the maximum current limit value calculation is not performed using a high temperature. Additionally, after the key switch is turned off, if the temperature detected by the temperature sensor 75 drops and goes below the predetermined value, T5 then the electrical source of the control device 7 is cut off. When it is reactivated the next time the processing is performed again from the beginning; however, at this point the temperature of the temperature sensor 75 has dropped, so a current limiting value calculation is not performed using a high temperature. In this way in Embodiment 8 it is possible to avoid performing a calculation of the motor current limit value at a high temperature, so good electrical power steering may be realized.

Embodiment 9

Explanation will now be made of an electric power steering control system according to Embodiment 9 of the present invention, making reference to the drawings.

Figure 31:
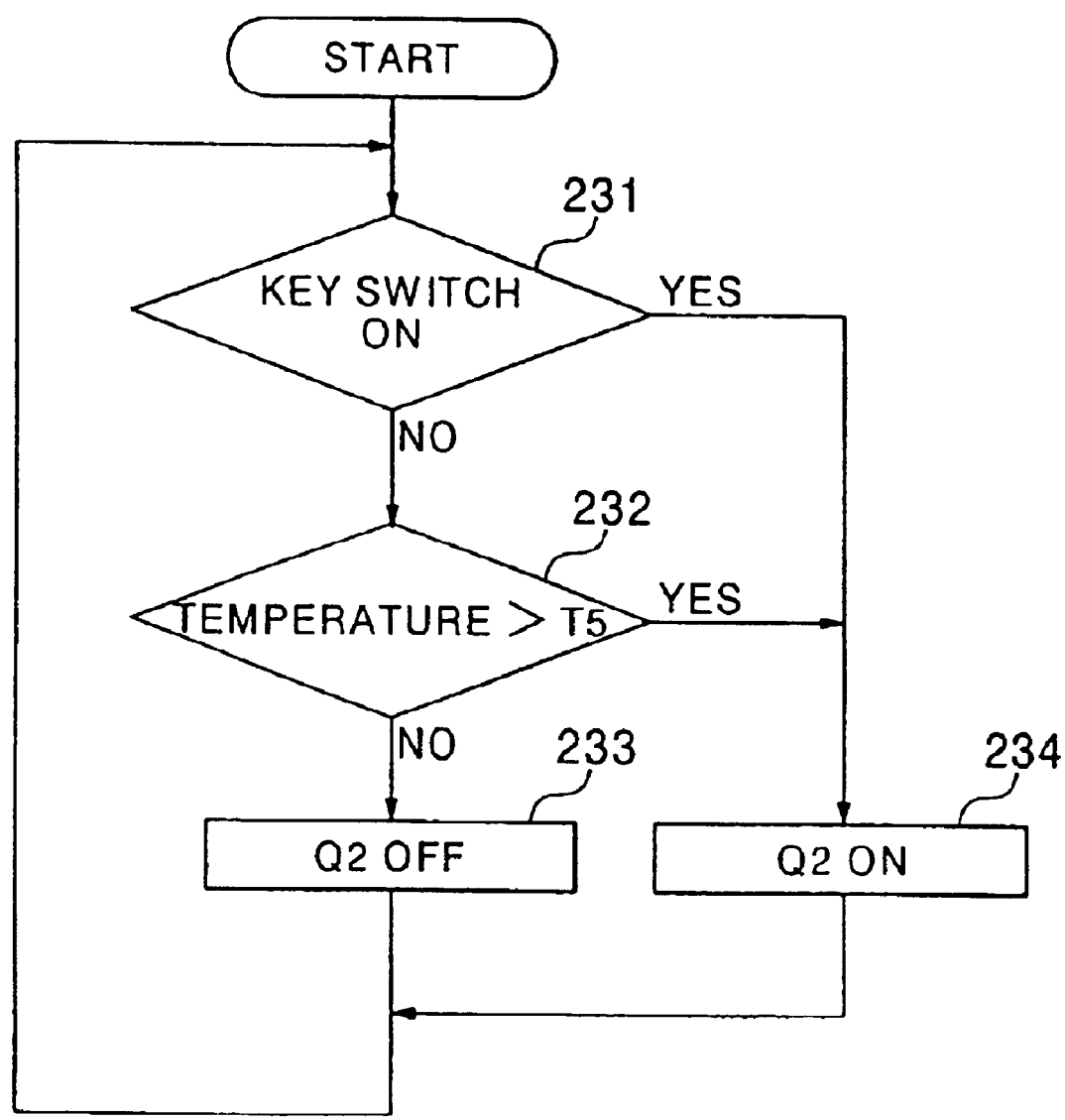
FIG. 31 is a flow chart depicting processing of a micon in the control apparatus in the electric power steering control system according to Embodiment 8 of the present invention.
Figure 32:
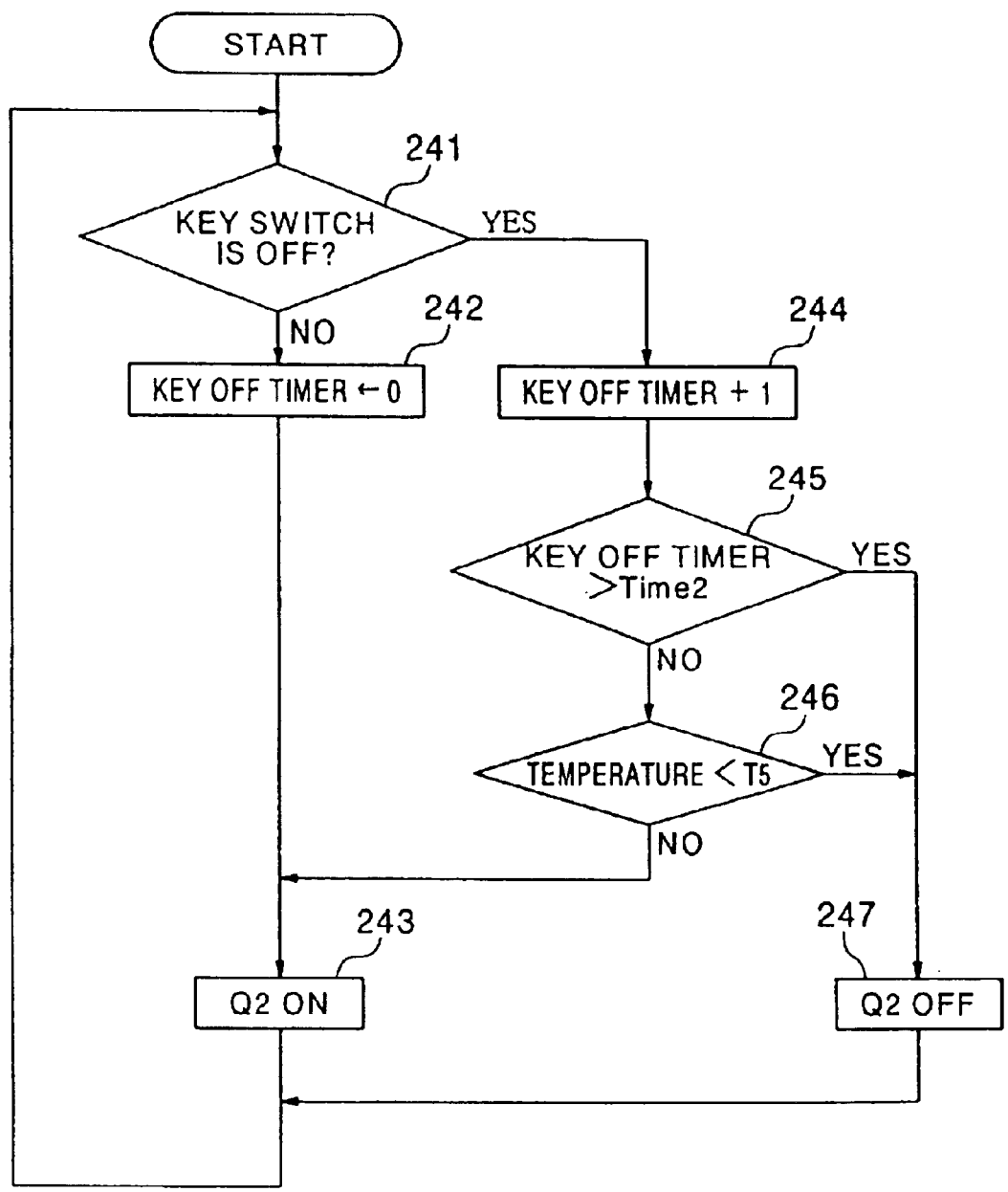
FIG. 32 is a flow chart depicting processing of a micon in a control apparatus in an electric power steering control system according to Embodiment 9 of the present invention.

In Embodiment 9 the flow chart in FIG. 31 pertaining to Embodiment 8 is changed to FIG. 32.

Explanation will now be made of FIG. 32. At step 241 the electrical source holding unit inside the micon 79 determines whether the key switch 5 is ON or OFF based key switch information inputted from the key switch I/F circuit 74 in FIG. 29, and in the case when the key switch is on the procedure splits off to NO. Next, at step 242 the key off timer is cleared to zero and at step 243 the VCONT signal (high) is outputted so as to turn on the transistor Q2. Then the procedure returns to step 241.

On the other hand, in the case when the key switch 5 is turned off, the procedure splits off to YES at step 241 and at step 244 the key off timer performs increments. Next, at step 245 the key off timer is checked, and when the key off timer is below a fixed time Time2 the procedure splits off to NO. At step 246 the temperature detected by the temperature sensor 75 and the predetermined value T5 are compared against each other, and when the detected temperature is greater than the predetermined value T5 the procedure splits off to NO and advances to step 243.

When the key off timer is greater than the predetermined value Time 2 at step 245 or when the temperature is less than the predetermined value T5 at step 246 the procedure advances to step 247, and the VCONT signal (low) is outputted so as to turn the transistor Q2 off. After that the process returns to step 241.

According to the process described above, when the temperature is greater than the predetermined value T5 after the key switch is turned off the transistor Q2 is turned on and the power supply is provided to the micon 79, and accordingly, it becomes possible to continue control. Further, when the temperature drops and goes below the predetermined value T5 the transistor Q2 is turned off, the provision of the power supply to the micon 79 is stopped and the control device 7 may be completely stopped; therefore, it is possible to obtain an effect equivalent to that of Embodiment 8.

Additionally, according to Embodiment 9, when a fixed duration of time elapses after the key off timer is used to turn the key switch off, according to step 247 the transistor Q2 is turned off and enables the control device 7 to be turned off. Because of this process, when the temperature sensor 75 fails and a state continues in which the detected temperature value exceeds the predetermined value T5 it is still possible to cut off the electrical source and stop the control device 7 when the predetermined duration of time elapses. Therefore, even if the temperature sensor 75 fails it is possible to prevent the battery from going dead.

Embodiment 10

Explanation will now be made of an electric power steering control system according to Embodiment 10 of the present invention, making reference to the drawings.

Figure 33:
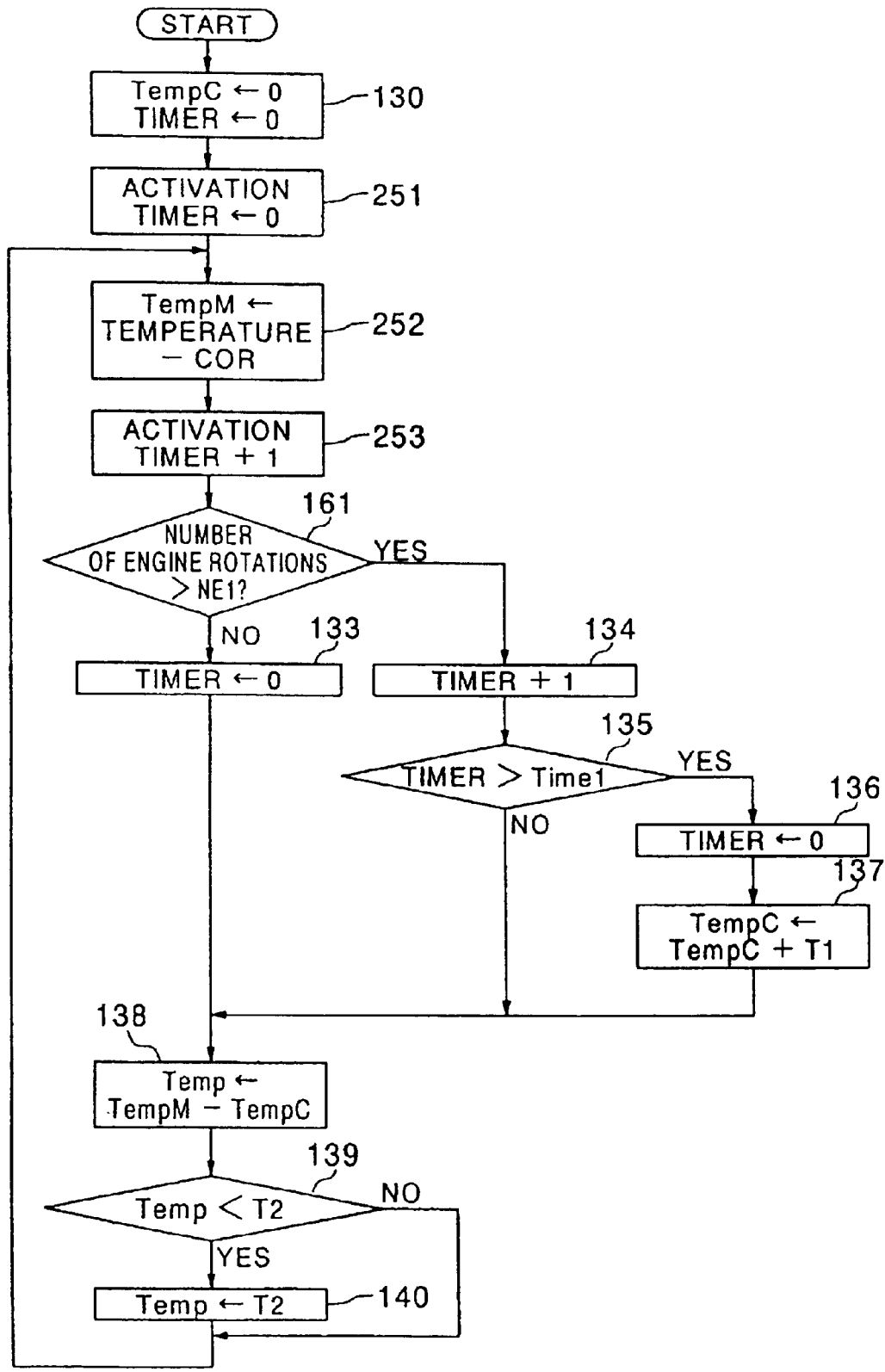
FIG. 33 is a flow chart depicting processing of a timer and a control temperature calculation unit of a control apparatus in an electric power steering control system according to Embodiment 10 of the present invention.

In Embodiment 10 the flow chart of FIG. 13 for Embodiment 3 is altered as depicted in FIG. 33. The reference numerals in FIG. 33 which are the same as those in FIG. 13 indicate processes which are the same as Embodiment 3. Note that Embodiment 10 may be applied not only to Embodiment 3, but also to Embodiments 1 and 2.

Explanation will be made of the points in FIG. 33 which are different from FIG. 13. First, after the control device 7 is activated, at step 130 the control temperature calculation unit 152 performs initialization of a corrected temperature value TempC and of the timer, and then at step 251 clears an activation timer to zero. Next, at step 252 a value equal to the temperature detected by the temperature sensor 75 less a correction amount COR is substituted for TempM. Next, at step 253 the above-mentioned activation timer is incremented. Thereafter, the processing from step 161 to step 140 is the same as in Embodiment 3 described above, and after that, the process returns to step 252 and repeats the same processing.

Figure 34:
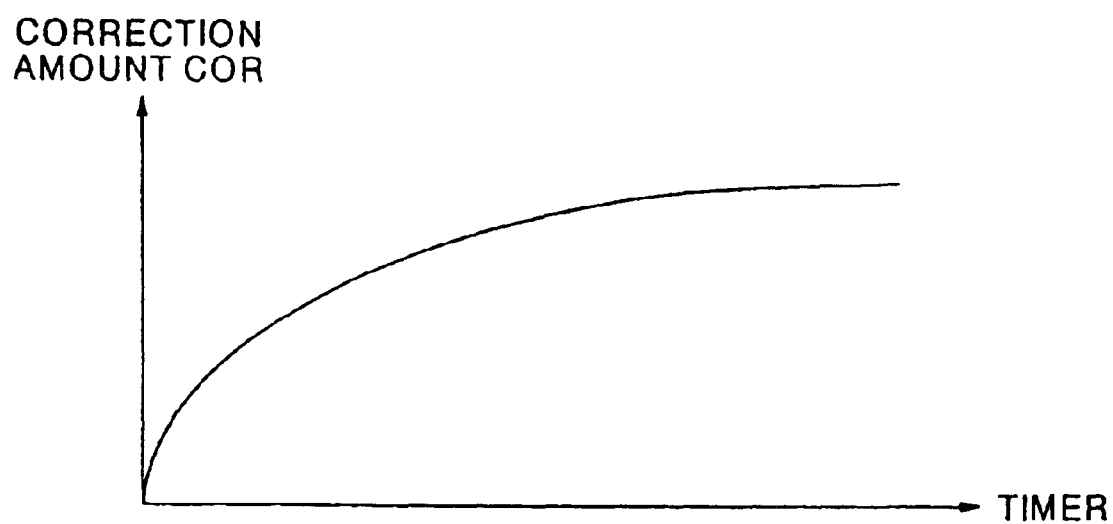
FIG. 34 is a diagram depicting characteristics of a correction amount of the control apparatus in the electric power steering control system according to 10 of the present invention.

Next, explanation will be made of the correction amount COR of step 252. This correction amount COR is a value which changes with time, as shown in FIG. 34, and this time is the time measured by the above-mentioned activation timer.

Typically, when the control device 7 is activated the temperature rises with time due to the energy consumed by the circuit inside the control device 7, even if the motor current is not transmitted. Due to this self-generation of heat, there develops a discrepancy between the temperature at the portion which needs to be measured and the detected temperature; therefore, calculation of the appropriate maximum current limit value becomes difficult. However, according to Embodiment 10, by setting the characteristics of the correction amount COR in FIG. 34 in accordance with the characteristics of the self-generation of heat it becomes possible to make a calculation of an appropriate maximum current limit value.

What is claimed is:

1. An electric power steering control system comprising:
   a motor for adding steering assistance force to a steering system;
   a steering force detection section for detecting steering force of the steering system; a motor current determination section for determining a motor current based on at least the steering force detected by means of the steering force detection section;
   a temperature detection section for detecting an ambient temperature;
   a timer for measuring time from when predetermined conditions are established;
   a control temperature calculation section for calculating a control temperature based on the temperature detected by the temperature detection section and the time measured by the timer;
   a coefficient setting section for setting a coefficient based on the control temperature calculated by the control temperature calculation section and the temperature detected by the temperature detection section;
   a motor current detection section for detecting a current being passed to the motor; a maximum current limit value calculation section for calculating a maximum current limit value based on a current detected by the motor current detection section and the coefficient set by the coefficient setting section;
   a current limiting section for selecting the smaller between the motor current determined by the motor current determination section and the maximum current limit value calculated by the maximum current limit value calculation section, and outputting this as a target current; and
   a motor current control section for passing the target current to the motor in such a way that the motor current is equal to the current detected by the motor current detection section.

2. An electric power steering control system according to claim 1, further comprising an engine rotation detection section for detecting the number of engine rotations, wherein the predetermined condition is that the number of engine rotations detected by the engine rotation detection section is greater than a predetermined value.

3. An electric power steering control system according to claim 1, further comprising a vehicle speed detection section for detecting a vehicle speed, wherein the predetermined condition is that the vehicle speed detected by the vehicle speed detection section is above a predetermined value.

4. An electric power steering control system according to claim 1, wherein the predetermined condition is that the steering force detected by the steering force detection section is greater than a predetermined value.

5. An electric power steering control system according to claim 1, wherein the predetermined condition is that the motor current is greater than a predetermined value.

6. An electric power steering control system according to claim 1, wherein the control temperature calculation section calculates the control temperature based on a temperature that is the temperature detected by the temperature detection section and corrected by a correction amount set in accordance with characteristics of self-generation of heat, and the duration of time measured by the timer.

* * * * *